(12) United States Patent
Stewart et al.

(10) Patent No.: US 11,873,358 B2
(45) Date of Patent: Jan. 16, 2024

(54) SYNTHETIC POLYMERS AND CROSSLINKED HYDROGEL SYSTEMS

(71) Applicant: McMaster University, Hamilton (CA)

(72) Inventors: Sarah Alison Stewart, Hamilton (CA); Harald Donald Helmut Stover, Hamilton (CA); Michael Bradley Coulson, Vancouver (CA)

(73) Assignee: McMaster University, Hamilton (CA)

( * ) Notice: Subject to any disclaimer, the term of this patent is extended or adjusted under 35 U.S.C. 154(b) by 695 days.

(21) Appl. No.: 16/618,252

(22) PCT Filed: May 29, 2018

(86) PCT No.: PCT/CA2018/050627
§ 371 (c)(1),
(2) Date: Nov. 29, 2019

(87) PCT Pub. No.: WO2018/218346
PCT Pub. Date: Dec. 6, 2018

(65) Prior Publication Data
US 2020/0148804 A1  May 14, 2020

Related U.S. Application Data

(60) Provisional application No. 62/512,336, filed on May 30, 2017.

(51) Int. Cl.
C08J 3/075   (2006.01)
C08J 3/24    (2006.01)
C08F 222/06  (2006.01)
C08F 8/34    (2006.01)

(52) U.S. Cl.
CPC .............. *C08F 222/06* (2013.01); *C08F 8/34* (2013.01); *C08J 3/075* (2013.01); *C08J 3/24* (2013.01); *C08J 2300/14* (2013.01)

(58) Field of Classification Search
CPC . C08F 222/06; C08F 8/34; C08J 3/075; C08J 2300/14; C08J 3/24
See application file for complete search history.

(56) References Cited

PUBLICATIONS

Miquelard-Garnier et al., Synthesis and Rheological Behavior of New Hydrophobically Modified Hydrogels with Tunable Properties, Macromolecules 2006, vol. 39, No. 23, pp. 8128-8139.*
Miquelard-Garnier et al., Synthesis and Rheological Behavior of New Hydrophobically Modified Hydrogels with Tunable Properties, Macromolecules 2006, vol. 39, No. 23, pp. 8128-8139. (Year: 2006).*

(Continued)

*Primary Examiner* — Robert D Harlan
(74) *Attorney, Agent, or Firm* — Gowling WLG (Canada) LLP

(57) ABSTRACT

A novel synthetic functionalized backbone polymer is provided which is a polyanionic side-chain functionalized backbone polymer comprising a hydrophilic backbone polymer functionalized with an activated alkene or epoxy group. The functionalized backbone polymer may be combined with a free or protected thiol-containing compound to form a crosslinked hydrogel having bio-medical application, and may additionally be combined with a hydrogel matrix to yield a hydrogel system useful for in vivo delivery of cells and other therapeutic agents.

15 Claims, 13 Drawing Sheets

(56) References Cited

PUBLICATIONS

By Miquelard-Garnier et al., Synthesis and Rheological Behavior of New Hydrophobically Modified Hydrogels with Tunable Properties, Macromolecules 2006, vol. 39, No. 23, pp. 8128-8139 (Year: 2006).*
Prokop, A., et al. "Advances in Polymer Science. vol. 136." (1998): 1-51.
Morinaga, Hisatoyo, et al. "Partially biobased polyamphiphile-bearing reactive epoxy groups in the side chains and its application to the hydrogel." Polymer bulletin 71.9 (2014): 2421-2435.
Supplemental European Search Report dated Jan. 27, 2021—references cited in the corresponding EP application 18809388.4.
Wang et al.—Delivery of Antisense Oligonucleotides using HPMA Polymer: Synthesis of a Thiol Polymer and its Conjugation to Water-Soluble Molecules—Bioconjugate Chem. 1998, 9, 749-757.
Morinaga et al.—"Partially biobased polyamphiphile-bearing reactive epoxy groups in the side chains and its application to the hydrogel", Polym. Bull (2014) 71:2421-2435.
Written Opinion dated Aug. 16, 2018—PCT/CA2018/050627.
International Search Report dated Aug. 16, 2018—PCT/CA2018/050627.
Miquelard-Garnier, G. et al., Macromolecules 2006, vol. 39, No. 23, pp. 8128-8139.
Stewart, S.A. et al., Langmuir 2016, vol. 32, pp. 1863-1870.
Morinaga, H. et al., Polym. Bull 2013, vol. 70, pp. 1113-1123.
Mateescu, A. et al., Membranes 2012, vol. 2, pp. 40-69.
Kosif et al., Fabrication of Maleimide Containing Thiol Reactive Hydrogels via Diels—Alder/Retro-Diels-Alder Strategy, Macromolecules 2010, vol. 43, No. 9 4140-4148.

* cited by examiner

SYNTHETIC POLYMERS AND CROSSLINKED HYDROGEL SYSTEMS

FIELD OF THE INVENTION

The present application generally relates to the design and preparation of novel synthetic polymers useful for incorporation into hydrogels systems useful for biomedical applications such as encapsulation or delivery of cells, therapeutic agents and the like.

BACKGROUND OF THE INVENTION

Synthetic polymers are chemically defined, scalable, and are increasingly being used to form hydrogels, often by employing efficient, biocompatible crosslinking chemistry such as "click reactions". Synthetic polymer hydrogels show many features reminiscent of natural extracellular matrices (ECM), and are hence being explored for use as ECM mimics. They can provide structural integrity to tissue constructs, control drug delivery, and serve as immunoisolation barriers for transplantation of therapeutic cells.

The polymers used to form a hydrogel must be water-soluble, hydrophilic and ideally, should be easily functionalized with the reactive groups needed for crosslinking and post functionalization. Crosslinking between two different polymers functionalized with mutually reactive functional groups has been recognized as a promising approach to form covalently crosslinked, cytocompatible polymer hydrogel without relying on the use of low molecular weight coupling or crosslinking reagents such as glutaraldehyde that are commonly cytotoxic.

Typically, these reactive polymers are combined with aqueous solutions of sodium alginate containing therapeutic cells or model cells, dropped into calcium alginate gelling baths to form calcium alginate beads containing one or both of the mutually reactive polymeric gel formers. Where only one reactive polymers is included within the calcium alginate bead, the second gel former, sometimes referred to as crosslinker, must be introduced to the beads by in-diffusion after beads have been formed.

Poly(ethylene glycol) (PEG) is widely used in the preparation of such crosslinked hydrogels, however, functionalization of PEG is restricted to the chain ends, which can limit the ability to fine-tune the physical and chemical properties of the material. To increase versatility, side-chain functionalizable hydrophilic polymers have been explored.

Poly(methyl vinyl ether-alt-maleic anhydride) (PMMAn) is a commercially available polymer that is readily side-chain functionalized, and has been used in a variety of biomedical applications. In its hydrolyzed form, poly(m-ethyl vinyl ether-alt-maleic acid) (PMM), is a hydrophilic polyanion under physiological conditions. Both the anhydride and the carboxylic acid groups offer sites for application-specific functionalization, electrostatic assembly with polycations, and complexation with multi-valent ions. PMMAn and PMM have been previously used as coatings for cell-containing capsules, and PMM functionalized with furan and maleimide was used to prepare crosslinked hydrogels through Diels-Alder coupling.

It would be desirable, thus, to develop a novel synthetic polymer with properties that render is suitable for the preparation of cross-linked hydrogels having utility in vivo.

SUMMARY OF THE INVENTION

It has now been found that a hydrophilic polyanionic backbone functionalized with an activated alkene is useful to form crosslinked biocompatible hydrogels.

Thus, in one aspect, a first side-chain functionalized synthetic polyanionic backbone polymer is provided comprising a hydrophilic backbone functionalized with an activated alkene or epoxy.

In another aspect, a crosslinked hydrogel is provided comprising a first side-chain functionalized backbone polymer functionalized with an activated alkene or epoxy group crosslinked with a free or protected thiol-containing compound.

In another aspect of the invention, a method of preparing a crosslinked hydrogel is provided comprising combining an aqueous solution of a first side-chain functionalized backbone polymer functionalized with an activated alkene or epoxy group crosslinked with an aqueous solution of a thiol-containing compound under conditions suitable for crosslinking to occur, wherein the thiol-containing compound is selected from a polar, water-soluble compound comprising two or more thiol groups and a second side-chain functionalized backbone polymer functionalized with a protected thiol group.

In a further embodiment, a hydrogel system is provided comprising a crosslinked hydrogel dispersed within a water soluble polymer matrix capable of being gelled using biocompatible means selected from divalent cation binding and thermal gellation. The crosslinked hydrogel comprises a first side-chain functionalized backbone polymer functionalized with an activated alkene or epoxy group crosslinked with a thiol-containing compound selected from a polar, water-soluble compound comprising two or more thiol groups and a second side-chain functionalized backbone polymer functionalized with a protected thiol group.

These and other aspects of the present application will become apparent from the detailed description and by reference to the following Figures.

DETAILED DESCRIPTION OF THE INVENTION

Figure 1:
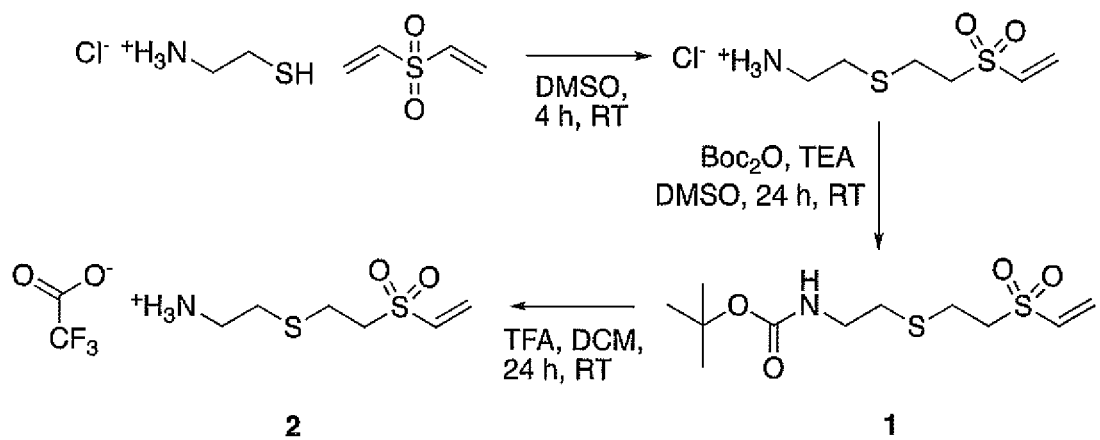
FIG. 1 shows a three-step synthesis for the formation of CVS TFA (2) through intermediate product N-BOC CVS (1).

In accordance with an aspect of the present invention, a biocompatible first side-chain functionalized synthetic polyanionic backbone polymer is provided comprising a hydrophilic backbone which is side-chain functionalized to incorporate an activated alkene or epoxy group.

The hydrophilic backbone may be a biocompatible polymer having a molecular weight between about 2000 to 2,000,000 Daltons, such as 5000 to 1,000,000 Daltons, or 20,000 to 500,000 Daltons. The polymer is a polyfunctional Michael acceptor suitable for crosslinking with a Michael donor. Examples of suitable polymers include, but are not limited to, homopolymers of polyacrylic acid or polymethacrylic acid or copolymers of acrylic acid or methacrylic acid with anionic, uncharged or cationic monomers including but not limited to, styrene sulfonic acid; acrylamides and methacrylamides such as acrylamide and N,N-dimethylacrylamide, or PEG acrylates and PEG methacrylates with degrees of polymerization of the PEG side chain of 1 to 20 or higher, and N,N-dimethylaminoethylmethacrylamide, N,N-dimethylaminoethylmethacrylate or acrylic anhydride. Other examples include polymers formed by copolymerization of alkyl vinyl ethers with an anhydride, e.g. of a dicarboxylic acid such as maleic, itaconic or citraconic acid, wherein the alkyl groups consist of ethyl, n-propyl, i-propyl, n, sec or t-butyl groups, and higher alkyl groups (e.g. $C_5$-$C_{12}$); vinyl ethers of ethylene oxide oligomers with an anhydride (e.g. maleic or itaconic anhydride); polyanhydrides based on polyacrylic acid that was dehydrated to form cyclic anhydride moieties along the polymer backbone; polymers of carboxylic acid anhydrides such as acetic anhydride, and copolymers of aromatic monomers such as styrene with maleic anhydride or other vinyl-functional anhydrides such as itaconic or citraconic anhydride, e.g. the alternating copolymer of styrene with a vinyl-functional anhydride. Additional backbone polymers include polymers containing epoxy groups such as glycidylmethacrylate, together with optionally neutral or anionic monomers selected from acrylamide and methacrylamide, N-alkylsubstituted acrylamides and methacrylamides, hydroxyethylacrylamide, hydroxyethyl-methacrylamide, PEG methacrylates; and acrylic acid, methacrylic acid, vinylbenzenesulfonic acid and their respective alkali metal salts.

A preferred backbone polymer is a copolymer of an alkyl vinyl ether with an acid anhydride such as maleic, itaconic or citraconic anhydride such as poly(methyl vinyl ether-alt-maleic acid since the anhydride side chains are readily functionalized, and made biocompatible by hydrolysis of remaining anhydride moieties following functionalization.

The backbone polymer is side-chain functionalized with a cross-linkable compound that is reactive with the backbone polymer and comprises an activated alkene or epoxy functionality. The activated alkene functionality may be, but is not limited to, a vinylsulfone, acrylate, methacrylate, maleimide or alkynyl group, substituted with electron-withdrawing groups such as esters. Alternatively, reactive epoxy groups may be introduced into the polymer backbone through reaction of epichlorohydrin with amino-functional polymers, or through use of an epoxy-functional vinyl monomer such as glycidylmethacrylate together with optionally neutral or anionic monomers selected from acrylamide and methacrylamide, N-alkylsubstituted acrylamides and methacrylamides, hydroxyethylacrylamide, hydroxyethylmethacrylamide, PEG methacrylates, and acrylic acid, methacrylic acid, vinylbenzenesulfonic acid and their respective alkali metal salts.

In addition to an activated alkene functionality, the cross-linkable compound also incorporates an entity that is reactive with the backbone polymer such as an amine group In one embodiment, compounds containing two activated alkene functionalities (e.g. divinylsulfone) may be combined with a moiety containing both a thiol group and an amine group, including alpha, omega thiolamines with a linear or branched $C_1$ to $C_6$ chain between the amine and thiol ends, which may contain other functional groups, such as hydroxyl, ether groups, or carboxylic acid groups and may be an amino acid (e.g. cysteine), its di- or tri-peptide or a sugar. Cysteamine is an example of an entity that may be combined with a compounds containing two activated alkene functionalities such as divinylsulfone, under conditions in which only one of the two activated alkenes reacts to form a linking compound such as cysteamine vinylsulfone. In another embodiment, cysteine may be combined with divinylsulfone under similar conditions, i.e. in which only one of the activated alkenes of the divinylsulfone reacts, to form cysteine vinylsulfone.

The first side-chain functionalized backbone polymer is synthesized by introducing the cross-linkable compound in amounts of 5 to 45 mol % of the reactive groups in the backbone polymer (e.g. anhydride, carboxylic acid or epoxy), and preferably between 10 and 30 mol % of the reactive anionic groups, such that the free amino group of the cross-linkable compound reacts with anionic groups (e.g. anhydride, epoxy or carboxylic acid groups) on the backbone polymer.

The first side-chain functionalized backbone polymer is used to prepare a cross-linked hydrogel by crosslinking with a thiol-containing crosslinking compound, e.g. free or protected dithiols and polythiols.

In one embodiment, the cross-linked hydrogel is formed by reacting an aqueous solution of about 0.5 to 15 wt % of the side-chain functionalized backbone polymer, and preferably an amount of about 2.5 to 7.5 wt % of the backbone polymer, with an aqueous solution of a di- or poly-thiol crosslinker. Examples of suitable crosslinkers include polar, water-soluble compounds carrying two or more thiol groups, such as polyethylene glycol (PEG)-dithiols having a molecular weight in the range of from about 200 to 1,000,000 Daltons, preferably a molecular weight of between about 1000 and 20,000 Daltons. The crosslinking reaction involves a Michael Addition of an electron-rich nucleophile (thiol) with an electron-poor alkene (e.g. vinylsulfone) of the side-chain functionalized backbone polymer in molar ratios ranging from 1:4 to 4:1, and preferably, 1:2 to 2:1. This addition reaction proceeds rapidly under physiological conditions without the need for catalysts, and without producing cytotoxic side products.

In another embodiment, the cross-linked hydrogel is formed by reacting the side-chain functionalized backbone polymer comprising an activated alkene functionality (i.e. the first side-chain functionalized backbone polymer) with a second side-chain functionalized backbone polymer. The second side-chain functionalized backbone polymer is functionalized with a cross-linkable compound that is reactive with the crosslinkable group (e.g. vinylsulfone) attached to the first backbone polymer and comprises a protected thiol. The backbone polymer of the second side-chain functionalized backbone polymer may be as described above, and may be the same or different than the backbone polymer of the first side-chain functionalized backbone polymer. A preferred backbone polymer is a copolymer of an alkyl vinyl ether with an acid anhydride such as maleic, itaconic or citraconic anhydride such as poly(methyl vinyl ether-alt-maleic acid).

The crosslinkable compound for preparation of the second side-chain functionalized backbone polymer will incorporate an entity that is reactive with the backbone polymer as in the first side-chain functionalized backbone polymer such as an amine group. The crosslinkable compound will also incorporate a protected thiol group. The protected thiol group is not particularly restricted, and may be any group that may be readily deprotected to yield a thiol that will react with the reactive alkene of the first side-chain functionalized backbone polymer to form a covalent linkage between the first and second functionalized backbone polymers. Examples of protected thiol groups that may be incorporated in the crosslinkable compound include, but are not limited to, thiopyridines, dithiocarbonates, dithiocarbamates and thioesters. A preferred crosslinkable compound is S-(2-aminoethylthio)-2-thiopyridine.

The second side-chain functionalized backbone polymer is synthesized similar to the first side-chain functionalized backbone polymer, by introducing the cross-linkable compound in amounts of 5 to 45 mol % of the reactive groups in the backbone polymer, and preferably between 10 and 30 mol %, such that the free amino group of the cross-linkable compound reacts with the reactive groups (e.g. anhydride, epoxy or carboxylic acid) of the backbone polymer.

The formation of a crosslinked hydrogel with the first and second side-chain functionalized backbone polymers is conducted in the presence of a reducing or deprotecting agent which functions to deprotect and expose the thiol functionality on the second side-chain functionalized backbone polymer so that it may react with the reactive alkene functionality on the first side-chain functionalized backbone polymer to form the desired crosslinked product. Any biocompatible deprotecting or reducing agent suitable to deprotect or reduce the protected thiol functionality may be used, including agents having a molecular weight of up to about 25,000. In one embodiment, a lower molecular weight deprotecting agent is used having a molecular weight of less than about 3000, preferably less than 1000. Examples of deprotecting agents that may be used in this reaction include, but are not limited to, phosphines such as tris(2-carboxyethyl) phosphine, tris(3-hydroxypropyl)phosphine (THPP) and dithiothreitol. Where the protected thiol group is present in the form of a dithiocarbonate, dithiocarbamate or thioester, the deprotecting agent used is an amine such as cysteamine, cysteine or an amino sugar.

The crosslinked hydrogel may be incorporated into a hydrogel matrix to provide a biocompatible hydrogel system for biomedical use. The hydrogel matrix is used herein to refer to a water soluble polymer matrix capable of being gelled using biocompatible means such as divalent cation binding and thermal gelation in accordance with established techniques. Examples of hydrogels that are suitable for use in the present hydrogel system include, but are not limited to, calcium alginate, strontium alginate, barium alginate, agarose and high viscosity gel-forming polymers such as cellulose sulphate which may be used instead of alginate, or together with alginate, as described in Prokop et al. (Adv Polym Sci 1998, 136, 1-51 and 53-73), the contents of which are incorporated herein by reference. Ionic gelling agents suitable for this purpose include calcium chloride or barium chloride.

The hydrogel system may be prepared by combining an aqueous solution of a selected hydrogel matrix with a solution of a first side-chain functionalized backbone polymer under conditions suitable to permit subsequent gelling of the hydrogel matrix (which may form beads or capsules when gelled), e.g. either in the presence of a divalent cation (e.g. in an amount of about 20 to 300 mM, optionally with about 20 to 150 mM of sodium chloride), or under thermal gelling conditions. A solution of di- or poly-thiol crosslinker is then combined with the gel for a period of time and under conditions sufficient to permit in-diffusion of the crosslinker and subsequent crosslinking with the backbone polymer. The amount of each component of the system may be varied to achieve the desired product. Generally, the hydrogel matrix solution comprises about 1-5% by wt of the hydrogel polymer, about 1-5% by wt of the first side-chain functionalized backbone polymer and about 1-5% by wt of the di- or polydiol crosslinker.

Alternatively, the hydrogel system may be prepared by combining an aqueous solution of a selected hydrogel matrix with a solution of a first side-chain functionalized backbone polymer and a second side-chain functionalized backbone polymer under conditions suitable to permit subsequent gelling of the hydrogel matrix. Crosslinking between the first and second side-chain functionalized backbone polymers is triggered by addition of a reducing or deprotecting agent, either at the time of gelling of the hydrogel matrix, or subsequent to gelling of the hydrogel matrix. Addition of the reducing agent at the time of gelling results in simultaneous gellation of the hydrogel matrix and covalent crosslinking between the first and second functionalized backbone polymers. Addition of the reducing agent subsequent to gelling results in co-entrapment of the first and second functionalized backbone polymers during gellation and subsequent crosslinking without any need for in-diffusion of macromolecular components required for crosslinking to occur. As above, the amounts of each component of the system may be varied to achieve the desired product. Generally, the hydrogel matrix solution comprises about 1-5% by wt of the hydrogel polymer, about 1-5% by wt of the first side-chain functionalized backbone polymer and about 1-5% by wt of the second side-chain functionalized backbone polymer. Gelling bath or subsequent deprotection solutions contain an excess of deprotecting agent over the protected thiol groups of the second functionalized backbone polymer, such as a 2-200-fold, and preferably 10-50-fold, molar excess over the protected dithiol groups, or an amount of about 0.005-1% by weight, and preferably 0.02-0.1% by wt, of the deprotecting agent.

Another advantage of this approach results from the sequestering of the first and second functionalized backbone polymers (or colocation thereof) within the nanometer-scale pores formed in the hydrogel matrix on gelling, to result in facile and rapid crosslinking between the crosslinkable groups of these polymers (i.e. the activated alkene and deprotected thiol groups). Further, the provision of a protected thiol group on the second functionalized backbone polymer permits premixing of both polymeric gel forming backbones within the hydrogel matrix, and optionally cells, therapeutic agent or other agents for encapsulation, prior to initiating the crosslinking reaction.

While both methods of preparing the hydrogel system result in the provision of a functional system, an advantage of crosslinking first and second functionalized backbone polymers within a hydrogel matrix avoids the need for a subsequently added macromolecular crosslinking component to diffuse into the hydrogel matrix, since both crosslinking components, namely, the first and second functionalized backbone polymers, are effectively co-entrapped within the hydrogel matrix (e.g. hydrogel bead that forms on gelling). Another advantage of this approach results from the co-sequestration and hence co-location of both the first and second functionalized backbone polymers within the nanometer-scale pores formed in the hydrogel matrix on gelling, to result in facile and rapid crosslinking between the crosslinkable groups of these polymers (i.e. the activated alkene and deprotected thiol groups), without any need for them to undergo macroscopic diffusion through a gelled hydrogel matrix (e.g. calcium alginate bead). There is no prohibitive diffusional resistance to the in-diffusion of the low molecular weight, cyto-compatible reducing/deprotection agent. Further, the provision of a protected thiol group on the second functionalized backbone polymer permits premixing of both polymeric gel forming backbones polymers within the hydrogel matrix, optionally in presence of cells, therapeutic agent or other agents for encapsulation, prior to initiating gelation and crosslinking.

As described, a hydrogel system may be prepared in which the present crosslinked hydrogels are encapsulated within a hydrogel matrix and form a crosslinked hydrogel core of the matrix. The crosslinked hydrogels may also form a shell surrounding a hydrogel matrix. In this regard, a hydrogel matrix such as an alginate solution is exposed to gelling conditions (e.g. cationic or thermal gelling). The resulting core-hydrogel beads, which may optionally be coated with a biocompatible cationic polymer such as poly-L-lysine, are dispersed into a hydrogel matrix (e.g. alginate solution) comprising the first sidechain functionalized polymer. The hydrogel matrix is gelled and then crosslinked, either by combination with the second sidechain functionalized polymer and subsequent addition of a deprotecting agent, or by subsequent addition of a di- or polythiol (e.g. PEG) as described herein.

The present biocompatible synthetic polymers, including the first side-chain functionalized backbone polymer, exhibit efficient crosslinking, either with a thiol-based crosslinker or with a second side-chain functionalized backbone polymer, that may be incorporated within a biocompatible hydrogel matrix to provide stable hydrogel systems having use in biomedical applications such as in vivo delivery of cells and other agents, e.g. pharmaceutical agents, for therapy. In this regard, the hydrogel-forming reactions are carried out under physiological conditions compatible with biomedical applications and the presence of live cells, including aqueous buffered solutions at a physiologically acceptable pH, e.g. pH of 7-8 and at a temperature between 0° C. and 37° C.

The synthetic cross-linked polymers were found to have sufficient strength for biomedical applications, exhibiting an elastic modulus ranging from 1 to 141 kPa, depending on the composition, which corresponds to the stiffness of a wide range of human tissues.

The synthetic cross-linked polymers also provide for post-functionalization, for example, at residual reactive sites (i.e. at the activated alkene site) with functional moieties (which may be also be introduced prior to side chain functionalization with the selected crosslinkable compound), including attachment promoting motifs such as RGD, cationic groups including primary or secondary amines, e.g. such as dimethylamino ethylamine, neutral groups with thiol moieties or other nucleophiles such as alcohols, e.g. aminoethanol; functional biomolecules such as anti-inflammatory cytokines, cell-promoting proteins, and growth factors, or small molecules (therapeutic agents, e.g. anti-inflammatory agents; detectable labels such as fluorescent labels, e.g. fluoresceinamine, TAMRA-cadaverine, fluoresceine cadaverine or rhodamine cadaverine, and the like. Post-functionalization may also include deactivation of residual reactive sites by addition of deactivating moieties such as cysteamine or other thiols to deactivate the reactive alkene sites.

Terms of degree such as the term "about" is used herein to refer to a reasonable deviation from a given amount such that the end result is not significantly changed, e.g. a deviation of at least ±5% of the given amount if this deviation would not negate the meaning or function of the given amount.

Embodiments of the invention are described in the following specific examples which are not to be construed as limiting.

EXAMPLE 1

PMM Functionalized with Cysteamine Vinyl Sulfone

A novel functionalized polymer was prepared according to the present invention. In particular, the hydrophilic polyanion, poly(methylvinylether-alt-maleic anhydride) (PMM) was functionalized with an activated alkene Michael acceptor, e.g. cysteamine vinyl sulfone Materials. Cysteamine hydrochloride, divinyl sulfone (DVS), poly(methyl vinyl ether-alt-maleic anhydride) ($M_n$=80 kDa), 4-(2-hydroxyethyl)-1-piperazineethanesulfonic acid (HEPES) sodium salt, fluoresceinamine, DMSO-$d_6$, potassium hydrogen phthalate (PHT) and 2-(N-morpholino)ethanesulfonic acid (MES hemisodium salt) were purchased from Sigma-Aldrich and used as received. Poly(ethylene glycol)-dithiol ($M_n$=1 kDa) (HS-PEG-SH) was purchased from Creative PEGWorks. Di-tent-butyl dicarbonate was purchased from Fluka Analytical. Triethylamine (TEA) and tri-sodium citrate dihydrate were purchased from EMD Performance Chemicals. Formic acid (≥98%) was purchased from EM Science. Anhydrous sodium sulfate, sodium chloride, calcium chloride dihydrate, acetonitrile, dichloromethane (DCM), ethyl acetate, hexane, dimethyl sulfoxide (DMSO), methanol, acetic acid, ethyl ether and trifluoroacetic acid (TFA) were purchased from Caledon Laboratory Chemicals and used as received. Deuterium oxide (99.99 atom % D) was purchased from Cambridge Isotope Laboratories. Sodium alginate (Pronova UP MVG) was purchased from NovaMatrix (Sandvika, Norway) and was used as received. Sodium hydroxide (1.0 N) was purchased from LabChem Inc. TAMRA-cadaverine was purchased from AnaSpec Inc. Thiopyridyl disulfide was purchased from Alfa Aesar. Dulbecco's modified Eagle's medium (DMEM, high glucose, pyruvate), fetal bovine serum (qualified, Canada origin), Penicillin-Streptomycin (10,000 U/mL), and 0.25% Trypsin-EDTA (1X) phenol red were obtained from Invitrogen (Burlington, ON). Calcein-AM/ethydium homodimer-1 (LIVE/DEAD Viability/Cytotoxicity Kit, for mammalian cells) was purchased from ThermoFisher Scientific. NIH/3T3 *Mus musculus* fibroblasts (CRL-1658) were obtained from ATCC.

Synthesis of N-BOC Protected Cysteamine Vinyl Sulfone (1). Cysteamine hydrochloride (1.102 g, 9.6 mmol) in DMSO (50 mL) was added dropwise to a stirred solution of divinylsulfone (DVS, 5.73 g, 48.5 mmol, 5.0 eq relative to cysteamine hydrochloride) in DMSO (10 mL) under stirring at room temperature. After vigorous stirring for 4 h, a solution of di-tent-butyl dicarbonate (3.175 g, 14.6 mmol) in DMSO (10 mL) and triethylamine (2.03 mL, 14.6 mmol, 1.5 eq relative to cysteamine hydrochloride) in DMSO (2 mL) was added dropwise at room temperature. After 24 h of stirring, distilled water (300 mL) was added to the flask, and the aqueous phase extracted in a separatory funnel with 4×150 mL DCM. The organic phases were combined, dried over anhydrous sodium sulphate, gravity filtered through filter paper, and concentrated by rotary evaporation. The resulting oil was loaded on a neutral silica gel column and eluted with 2×400 mL 1:3 ethyl acetate/hexanes, 2×300 mL 1:2 ethyl acetate/hexanes, followed by 1×400 mL ethyl acetate (FIG. 1), monitored by silica TLC. N-BOC cysteamine vinyl sulfone (1) (2.47 g, 8.4 mmol) was obtained as a clear colorless oil in 87.5% yield. $^1$H NMR (600 MHz, DMSO-$d_6$): 6.99 (dd, J=9.6 Hz, 16.8 Hz, $CH_2$=$CHSO_2$, 1H), 6.92 (bt, BOC-NHC), 6.29 (m, $CH_2$=C, 2H), 3.40 (m, $NHCH_2CH_2$, 2H), 3.09 (m, $CH_2CH_2SO_2$, 2H), 2.75 (m, $NHCH_2CH_2S$, 2H), 2.60 (m, $SCH_2CH_2SO_2$, 2H), 1.39 (s, $(CH_3)_3C$, 9H).

Synthesis of Cysteamine Vinyl Sulfone Trifluoroacetate (2). N-BOC cysteamine vinyl sulfone (1) (1.01 g, 3.42 mmol) was dissolved in DCM (50 mL), and an excess of TFA (2 mL, 26 mmol) was added dropwise to the vigorously stirred solution (FIG. 1). The reaction mixture was stirred for 4 h, and then concentrated under a stream of nitrogen while the solution was warmed in a 40° C. water bath. Cysteamine vinyl sulfone trifluoroacetate (2) (0.83 g, 2.66 mmol) was obtained as a viscous yellow oil in 78% yield. $^1$H NMR (600 MHz, DMSO-$d_6$): 7.91 (bs, $^+NH_3CH_2$), 7.01 (dd, $CH_2$=$CHSO_2$, 1H), 6.30 (q, $CH_2$=CH, 2H), 3.45 (m, $NH_3CH_2CH_2$, 2H), 3.00 (m, $CH_2CH_2SO_2$, 2H), 2.80 (m, $CH_2CH_2SCH_2CH_2$, 4H).

Synthesis of PMM-CVS-f with 10, 20, and 30 mol % CVS. PMMAn (0.250 g, 1.6 mmol anhydride) was dissolved in 10 mL acetonitrile. Fluoresceinamine (5 mg, 0.014 mmol, 0.9 mol %) was dissolved in 1 mL 1:1 DMF:acetonitrile and added dropwise to the vigorously stirring PMMAn solution. To this solution, triethylamine (TEA) (150 μL, 0.1088 g 1.1 mmol) was added and allowed to react overnight at room temperature. Cysteamine vinyl sulfone trifluoroacetate (2) (175.1 mg, 0.577 mmol, 35 mol % relative to anhydride groups in PMMAn) was dissolved in 5 mL 1:1 DMSO:acetonitrile and was added dropwise over a few minutes to the stirring solution. After 24 h at room temperature, the resulting solution was dialyzed (Spectrapor, MWCO=3500 Da) against 4 L of 0.05 M NaCl for 1 day and then against 4 L distilled water for 3 days, changed daily. The dialyzed solution was then lyophilized, leading to the isolation of PMM-$CVS_{30}$ as a yellow powder. Other PMM-$CVS_x$ derivatives ranging from 10-30% functional loading were prepared, along with unlabelled analogs. $^1$H NMR was used to determine the degree of functionalization, using the CVS vinyl signals (δ6.25-7.0 3H), referenced to the polymer backbone $CH_2$ signal (δ1.75 2H).

Preparation of PMM-$CVS_x$ HS-PEG-SH gels for Physical Characterization. Hydrogels were prepared by combining PMM-CVSx and HS-PEG-SH with a 1:1 CVS:thiol molar ratio in varying polymer concentrations and degrees of CVS functionalization. The following example describes the preparation of a gel with 2.5% w/v PMM-$CVS_{10}$. PMM-$CVS_{10}$, (10 mg; 5.3 μmol CVS) was dissolved in 300 82 L HEPES buffer (50 mM) and the pH adjusted to 7.4±0.2 using 5 M NaOH. HS-PEG-SH (2.7 mg; 5.4 μmol thiol) was placed in a separate vial and dissolved in 100 μL of distilled water. The two solutions were mixed and pipetted into 4 silicone rubber mould wells, on a glass slide (diameter=7 mm, depth=5 mm, volume=100 μL, n=4). The moulds were then sealed using a sheet of silicone rubber, wrapped in a damp paper towel to avoid water evaporation and allowed to gel for 24 h at 37° C. Gels were prepared in a similar fashion from PMM-CVS with 10, 20 and 30% degrees of functionalization and PMM-CVS loadings of 2.5, 5 and 7.5% w/v.

Gelation Profiling and Efficiency. Gelation of a PMM-CVS HS-PEG-SH hydrogel was monitored over a 24 h period by NMR, using a 600 MHz Bruker spectrometer (ns=64, d1=1 sec). 30 mg PMM-$CVS_{30}$ (42.8 mol CVS) was dissolved in 500 μL $D_2O$ HEPES buffer (25 mM) with an external PHT standard (0.5 mg, 2.45 μmol), fixed to pD 7.5 using 5 M $D_2O$/NaOH, loaded into an NMR sample tube, and a preliminary spectrum was obtained. 21.4 mg HS-PEG-SH (42.8 μmol thiol) was dissolved in 100 μL $D_2O$, and mixed thoroughly with the vinyl sulfone-containing solution. $^1$H spectra were obtained at set time points throughout the 24 h period.

Mechanical Properties of Gels. Gel disks prepared in silicone moulds as described above, were uncovered, coated with one drop (~0.05 mL) of silicone oil to reduce water evaporation, and placed on a microscope stage. A glass melting point tube (VWR, diameter=0.85 mm) was attached to a force transducer (Transducer Techniques GSO, 10 g full scale) and positioned with the closed rounded end just above a gel disk. The indenter was programmed to move downward at a constant speed of 0.2 mm/s for as-formed gels, and 0.4 mm/s for swollen gels, while measuring the force relative to time and vertical position. Each gel was measured at three points on its surface.

Swelling Studies. Gel disks prepared in silicone moulds as described above were weighed, placed in 24-well plates, covered with 3 mL PBS buffer (10 mM phosphate, 154 mM NaCl, pH 7.4), and incubated at 37° C. for 7 days. Wells not containing gels were filled with distilled water and the lidded plates wrapped in a damp paper towel in order to limit water loss. Buffer was replaced five times during this time. After one week, gels were removed from their wells, wiped gently with a Kimwipe to remove excess water, and weighed. Swelling ratios were calculated as the ratio of final to initial mass.

Hydrolytic Stability of PMM-CVS. 10 mg of PMM-$CVS_{30}$ was dissolved in 1 mL HEPES buffer (50 mM) with an internal formic acid standard (50 mM), prepared in $D_2O$, fixed to either pD 7.7. or 8.7 with 5M $NaOH/D_2O$. The samples were maintained at 37° C. and the disappearance of CVS vinyl signals ($\delta 6.25$ to $\delta 7.0$) were monitored by $^1H$ NMR for three weeks.

Post Modification of Residual Vinyl Sulfone Units. 50 mg of $PMM-CVS_{30}$ (71.2 µmol CVS) was dissolved in 0.8 mL HEPES buffer (25 mM, pH 7.8) with an external PHT standard (2.7 mg, 13.1 µmol), prepared in $D_2O$, fixed to pD 7.4 with 5M $NaOH/D_2O$. 18 mg HS-PEG-SH (36 µmol thiol, 0.5:1 Thiol:CVS) was dissolved in 200 µL $D_2O$. The two solutions were mixed briefly and pipetted into 6 silicone rubber mould wells, on a glass slide (diameter=7 mm, depth=5 mm, volume=150 µL, n=6). The moulds were then sealed using a sheet of silicone rubber, wrapped in a damp paper towel to avoid water evaporation and allowed to gel for 24 h at 37° C. The resulting gels were removed from moulds, ground to particles 50-150 nm in size using a mortar and pestle, suspended in 4 mL $D_2O$ and fixed to pD 7.4, The resulting suspension was collected and centrifuged (3500 RPM, 5 min), and the supernatant removed. Two NMR samples were prepared containing 1.1 mL of dense gel packing. Sample 1 was used as a control, and nothing further was added. To sample 2 (0.733 mg, 3.6 µmol PHT, 4.71 µmol CVS), 3 stepwise additions of cysteamine HCl were added. Cysteamine HCl was dissolved in 1 mL $D_2O$ and 100 µL of this solution was added into Sample 2 (A: 0.175 mg, 1.5 µmol B: 0.35 mg, 3.1 µmol C: 0.175 mg, 3.1 µmol) and mixed thoroughly. $^1H$ spectra were acquired using a 600 MHz NMR spectrometer (ns=64, d1 =1 second).

pH Dependent Gel Time Investigation. The gelation times of 5% w/v PMM-CVS solutions of different functional percentages (10, 20, 30%), crosslinked with HS-PEG-SH, were measured in triplicate at four different pH values (6.5, 7, 7.5, and 8.5) using a horizontal tilt test. 40 mg PMM-$CVS_x$ was dissolved in HEPES buffer (300 µL, 100 mM) and the pH adjusted to the target value using sodium hydroxide (5 M) or hydrochloric acid (1 M). Deionized water was added to bring the solution to 400 µL in volume, resulting in HEPES buffered (75 mM) solution of 10% w/v PMM-$CVS_x$. An analogous stock solution of equimolar HS-PEG-SH was prepared in 1 mL deionized water, and 100 µL aliquots of each PMM-$CVS_x$ stock solution was mixed with 100 µL of HS-PEG-SH stock solution. The mixtures were maintained at 37° C., tested every ~30 sec for the first 5 min, every ~60 s until 20 min, and every ~5 min until 45 min. If the mixture did not flow when the vial was tilted 90°, the sample was considered to have gelled. Hydrogels that did not gel during this time were maintained at 37° C. and tested at 24 and 48 h time points. These tests were carried out in triplicate.

In Vitro Cytotoxicity. The cytotoxicity of the PMM-CVS hydrogels to NIH 3T3 *Mus musculus* fibroblasts was explored using a live/dead calcein AM/ethidium homodimer-1 (EthD-1) assay. The fibroblasts were cultured in tissue culture flasks in Dulbecco's Modified Eagle Medium (DMEM) supplemented with 10% v/v Bovine Calf Serum (BCS) and 1% v/v Penicillin/Streptomycin (PS) in a 5% $CO_2$ environment at 37° C. with 100% humidity in a water-jacketed incubator. When 75-80% conflueney was reached, cells were washed with PBS (pH 7.4, Invitrogen) and detached using 0.25% Trypsin-EDTA (1X) phenol red before subculturing into renewed DMEM. Solutions of PMM-CVS and HS-PEG-SH were syringe filtered prior to the cytotoxicity assays and measurements were taken in triplicate for the PMM-CVS gels, and quadruplicate for the control.

NIH 3T3 fibroblasts were suspended in DMEM media supplemented with 10% FBS, 1% PS, and containing 5% w/v $PMM-CVS_{20}$ and equimolar HS-PEG-SH. The fibroblast/polymer solutions ($1.5 \times 10^4$ cells per well) were transferred into the wells of a glass-bottom 96-well plate and incubated for over 24 h. After incubation, the live/dead assay was used to determine cell viability and examine the cytotoxicity of the resulting hydrogels on the encapsulated cells. Calcein AM/EthD-1 solution (100 µL of 2 µM calcein AM and 4 µM EthD-1 in sterile PBS) was added to each well and incubated at room temperature for 20 minutes. Fluorescence images were obtained using a Nikon Eclipse Ti confocal microscope. Cell viability was calculated by counting the number of live and dead cells and determining the percent cell viability=[(# live cells/(# live cells)+(# dead cells)]×100%.

Synthesis of S-(2-aminoethylthio)-2-thiopyridine. S-(2-aminoethylthio)-2-thiopyridine was synthesized according to a procedure adapted from Zhang et al. (J. Mater. Chem. B. 2016, 4, 3387-3397). Briefly, thiopyridyl disulfide (4.41 g, 20.0 mmol) was dissolved in 20 mL of methanol (MeOH). Then, 0.8 mL of acetic acid was added to the reaction flask. Cysteamine hydrochloride (1.14 g, 10.0 mmol) was dissolved in 10 mL of MeOH and added to the thiopyridyl disulfide solution. The reaction was allowed to continue for 48 h at room temperature with constant stirring. The solution was then evaporated under vacuum to produce a yellow oil. The oil was washed with 50 mL of diethyl ether. A yellow precipitate formed and was dried under a stream of air. The precipitate was then dissolved in 10 mL of MeOH. The solution was added dropwise into 200 mL of cold diethyl ether and the precipitate was collected, re-dissolved in 10 mL MeOH, precipitated again in 200 mL cold diethyl ether and isolated using vacuum filtration to obtain a white powder. S-(2-aminoethylthio)-2-thiopyridine (SPy) was characterized using $^1H$-NMR spectroscopy.

Synthesis of $PNM-SPy_x$. PMM functionalized with SPy ($PMM-SPy_x$) was prepared at three different functional group loadings, $PMM-SPy_{10}$, $PMM-SPy_{20}$ and $PMM-SPy_{30}$. The following illustrates the synthesis of $PMM-SPy_{30}$. PMMAn (0.250 g, 1.6 mmol anhydride) was dissolved in 10 mL acetonitrile. Triethylamine (TEA) (150 µL, 1.1 mmol) was added to the solution and it was allowed to react for 12 h at room temperature. SPy (124.7 mg, 35% mol relative to anhydride) was dissolved in 5 mL 1:1 dimethyl sulfoxide:acetonitrile and added dropwise to the reaction over 5 minutes. The reaction was allowed to stir for 24 h at room temperature, the dialyzed (Spectrapor, MWCO=3500 Da) against 4 L 0.05 M NaCl solution for 2 days followed by 4 L dH2O for 3 days. The resulting solution was lyophilized and produced a tan powder. The degree of SPy functionalization was determined using $^1$H-NMR, by referencing the pyridine ring proton signals ($\delta$7.2, 1H; $\delta$7.5-7.8, 2H; $\delta$8.3, 1H) to the PMMAn polymer backbone ($\delta$1.84, 2H).

NMR Study of TCEP Degradation of Disulfide Bonds in PMM-SPy$_x$. The time frame of tris(2-carboxyethyl) phosphine HCl (TCEP) degradation of disulfide bonds in PMM-SPy$_x$ was determined using $^1$H-NMR spectroscopy. A 5 mL 0.4% w/v solution of PMM-SPy$_{20}$ was made in 0.5 M HEPES buffer in D$_2$O. TCEP (0.0557 g, 10× molar excess) and ca. 0.1 mL formic acid was added and the pD of the solution was adjusted to 7.8 (pH=7.4). $^1$H-NMR spectra of the polymer solution were taken before TCEP addition and 8 minutes after TCEP addition.

Preparation of PMM-CVSx/HS-PEG-SH/Alginate Composite Beads. Beads were prepared at various functional group loadings and polymer concentrations. The following is the procedure for preparation of 1% PMM-CVS$_{20}$ beads with a 4:1 thiol:CVS ratio. Sodium alginate (75 mg, 1.5% w/v) was dissolved in 5 mL 100 mM HEPES buffer solution and filtered through a 0.45 µm then 0.20 µm syringe filter. PMM-CVS$_{20}$ (10 mg) was dissolved in 250 µL of 100 mM HEPES buffer solution. 750 µL of the alginate solution was added to the PMM-CVS$_{20}$ solution. The resulting 1 mL solution contained 1% w/v PMM-CVS$_{20}$ and 1.125% w/v alginate. The solution was extruded through a 27 gauge needle at 0.5 mL/min into 50 mL of a 100 mM CaCl$_2$/77 mM NaCl gelling bath. The beads were allowed to settle in the gelling bath for approximately 10 minutes before being removed by a plastic pipette and placed in a conical vial with 3 mL gelling bath. Approximately 50% of the beads were placed in a glass vial and the supernatant removed. A 1 mL solution of HS-PEG-SH (1 kDa) (38.2 mg, 4×mol relative to CVS) was added to the vial. After 24 hours the beads were washed five times with 5 mL gelling bath. This was repeated with 4 different concentrations of 1 kDa HS-PEG-SH solution, with a 4:1, 3:1, 2:1 and 1:1 ratio of thiol:vinyl sulfone.

Additional sets of beads were prepared using 8 kDa HS-PEG-SH at 1% w/v PMM-CVS$_x$ as well as 1 kDa HS-PEG-SH at 2% w/v PMM-CVS$_x$, according to the above procedure.

Determination of Bead Swelling Ratio. Approximately 50 beads were divided between five wells in a 48-well plate. Bead diameter was measured using a Nikon eclipse Ti inverted fluorescent microscope. Supernatant was removed from the wells using a glass pipette, and replaced with 0.3 mL 75 mM sodium citrate solution. Bead diameter was again measured at 1, 2, 10, 20, 40 and 60 minutes after citrate addition. A swelling ratio was calculated by dividing the average bead diameter at 60 minutes by the average bead diameter before citrate addition (t=0 min), This was repeated for all sets of PMM-CVS$_x$/HS-PEG-SH/alginate and PMM-CVS$_x$/PMM-SPy$_x$/alginate beads synthesized.

Optimization of PMM-CVS$_x$/PMM-SPylAlginate Composite Beads. PMM-CVS$_{20}$-r (10 mg) and PMM-SPy$_{20}$ (10 mg, 9.71 µM SPy) were dissolved in 250 µL 100 mM HEPES buffer solution. Sodium alginate (75 mg, 1.5% w/v) was dissolved in 5 mL of 100 mM HEPES buffer solution and filtered through a 0.45 gm then 0.20 gm syringe filter. The PMM-CVS$_{20}$-r/PMM-SPy$_{20}$ solution was mixed with 750 µL 1.5% w/v sodium alginate solution to give a 1 mL solution containing 1% w/v PMM-CVS$_{20}$-r, 1% w/v PMM-SPy$_{20}$ and 1.125% sodium alginate. The bead solution was extruded through a 27 gauge flat-tipped needle at 0.5 mL/min with a concentric air flow of 3 L/min into 50 mL 35 mM HEPES-buffered gelling bath (35 mM HEPES, 100 mM CaCl$_2$, 77 mM NaCl). The gelling bath solution also contained 0.0279 g tris(2-carboxyethyl) phosphine HCl (TECP) (97.1 µM, 10×mol relative to SPy) and the pH of the solution was adjusted to 7.4-7.8 using 1 M NaOH. Bead samples were removed from the TCEP-containing HEPES-buffered gelling bath at 4 minutes, 1 hour, 2 hours and 4 hours after extrusion of the bead solution into the bath, then imaged to determine swelling ratio. Another set of beads was allowed to sit in TCEP-containing HEPES-buffered gelling bath for 15 minutes, then washed three times with 15 mL HEPES buffered gelling bath. Bead samples were removed at 4 minutes, 1 hour, 2 hours and 4 hours after washing and imaged to determine swelling ratio. Swelling ratios of each set of beads were determined as described above, as well as a 24 hour swelling ratio calculated by dividing the bead diameter after 24 h in 0.3 mL 75 mM citrate solution by the bead diameter before citrate addition.

A control study was also done in which a 1% w/v PMM-CVS$_{20}$-r, 1% w/v PMM-SPy$_{20}$ and 1.125% sodium alginate solution was extruded through a 27 gauge flat-tipped needle at 0.5 mL/min with a concentric air flow of 3 L/min into 50 mL HEPES-buffered gelling bath (35 mM HEPES/100 mM CaCl$_2$/77 mM NaCl). The gelling bath did not contain TCEP. After 24 h in gelling bath, 0.3 mL 75 mM citrate solution was added to ca. 10 beads in a well plate. The wells were imaged using a Nikon eclipse Ti inverted fluorescent microscope after beads had been left for 1 h in citrate solution.

Preparation of PMM-CVS$_x$/PMM-SPy$_x$/Alginate Composite Beads. Beads were prepared at various functional group loadings and polymer concentrations. The following is the procedure for preparation of 1% PMM-CVS$_{20}$-r/1% PMM-SPy$_{20}$ beads. Sodium alginate (75 mg, 1.5% w/v) was dissolved in 5 mL of 100 mM HEPES buffer solution and filtered through a 0.45 µm then 0.20 µm syringe filter. PMM-CVS$_{20}$-r (10 mg) and PMM-SPy$_{20}$ (10 mg, 9.71 µM SPy) were dissolved in 250 µL of 100 mM HEPES buffer solution. 750 µL of the 1.5% alginate solution was added to the PMM-CVS$_{20}$-r/PMM-SPy$_{20}$ solution. The resulting 1 mL solution contained 1% w/v PMM-CVS$_{20}$-r, 1% w/v PMM-SPy$_{20}$ and 1.125% w/v alginate. A solution of 35 mM HEPES/100 mM CaCl$_2$/77 mM NaCl gelling bath was made and 0.0279 g TCEP (97.1 µM) was added. The pH of this solution was adjusted to 7.4-7.8 using 1 M NaOH. The bead solution was extruded through a 27 gauge flat-tipped needle at 0.5 mL/min, with a concentric air flow of 3 L/min, into 50 mL of the gelling bath. The beads were allowed to sit in the gelling bath for 15 minutes and then washed three times with 15 mL 35 mM HEPES/100 mM CaCl$_2$/77 mM NaCl gelling bath. The beads then sat in gelling bath for 1 h prior to testing. This procedure was repeated in the polymer pairings shown in Table 1.

TABLE 1

| Polymer 1 | Polymer 1 conc'n (w/v) | Polymer 2 | Polymer 2 conc'n (w/v) | $m_{TCEP}$ (g) |
|---|---|---|---|---|
| PMM-CVS$_{10}$ | 1% | PMM-SPy$_{10}$ | 1% | 0.0152 |
| PMM-CVS$_{30}$ | 1% | PMM-SPy$_{30}$ | 1% | 0.0386 |
| PMM-CVS$_{10}$ | 1.5% | PMM-SPy$_{10}$ | 1.5% | 0.0227 |
| PMM-CVS$_{20}$-r | 1.5% | PMM-SPy$_{20}$ | 1.5% | 0.0417 |
| PMM-CVS$_{30}$ | 1.5% | PMM-SPy$_{30}$ | 1.5% | 0.0579 |

Photobleaching of PMM-CVSIPMM-SPy$_{20}$/Alginate Composite Beads. PMM-CVS$_{20}$-r/PMM-SPy$_{20}$/alginate beads were prepared as described above, at a 1% w/v polymer loading. Approximately 10 beads were placed in one well of a 48-well plate. 0.3 mL 75 mM sodium citrate solution was added to the well, and the beads were allowed to sit for 1 h. The beads were imaged on a Nikon Eclipse Ti confocal microscope and a small region of the bead interior was photobleached by focusing the microscope on one region and increasing the laser intensity. The laser intensity was returned to normal settings and the bead was imaged at 1, 10, 20, 30, 40, 50 and 60 minutes after photobleaching.

RESULTS

Synthesis of Cysteamine Vinyl Sulfone Trifluoroacetate. In the current work, CVS was prepared and isolated as the TFA salt as outlined in FIG. 1, and used in pure form to prepare vinylsulfone-functionalized PMM, a novel polyanionic poly-ene suitable for crosslinking with di- and polythiols in aqueous media under physiological conditions.

Reaction of cysteamine HCl with an excess of DVS resulted in complete conversion of the cysteamine as confirmed by $^1$H NMR through disappearance of cysteamine ethylene signals at $\delta 3.5$ and $\delta 3.13$, and appearance of the new ethylene signals at $\delta 2.8$ and $\delta 3.0$. The resulting CVS was converted to N-BOC CVS, which for the first time allowed purification and isolation by column chromatography. $^1$H NMR confirmed the presence of the t-butyl protecting group ($\delta 1.4$ 9H, s), as well as a downfield shift of the cysteamine methylenes adjacent to the thioether ($\delta 2.75$ 2H, $\delta 2.6$ 2H). After purification, N-BOC CVS was deprotected using TFA in DCM. Solvent and excess TFA were evaporated under a nitrogen stream with gentle heating, allowing for the first time isolation of pure CVS as a TFA salt in 68% yield. The presence and purity of the final CVS TFA product was confirmed by convergence of $^1$H NMR signals adjacent to the thioether ($\delta 2.8$), as well as the disappearance of the t-butyl signal ($\delta 1.4$, 9H, s).

Alternate synthesis of CVS. An alternate synthesis of CVS was developed that uses protonation instead of a covalent protecting group to prevent reaction of the amine group with vinylsulfone. This procedure is faster and more suitable for scale-up. Cysteamine HCl (1.9 g, 8.8 mmol) was dissolved in 10 mL water and added dropwise through an addition funnel to a stirring solution of divinyl sulfone (5 mL, 49.8 mmol, 5.6× molar excess). The biphasic mixture was allowed to react at room temperature for 6 h, and was then extracted once with 40 mL CHCl$_3$, followed by 5×20 mL CHCl$_3$. The aqueous phase was dried with sodium sulfate and then lyophilized to give a viscous oil. The oil was dissolved in 10 mL of MeOH to give a saturated solution, followed by addition of 90 mL of dry dichloromethane (DCM). The precipitate was filtered out and discarded. The MeOH/DCM mixture containing the desired product was passed through a 1 cm silica plug using 800 mL of 10% MeOH in DCM. The collected fraction was dried on a rotary evaporator to give the product, CVS HCl, as a waxy white solid with 77% yield. The product was characterized via $^1$H NMR: $\delta$ 6.85 (1H), $\delta$ 6.43 (1H), 6.36 (1H), $\delta$ 3.52 (2H), $\delta$ 3.19 (2H), $\delta$ 2.92 (2H) and $\delta$ 2.87 (2H).

Figure 2:
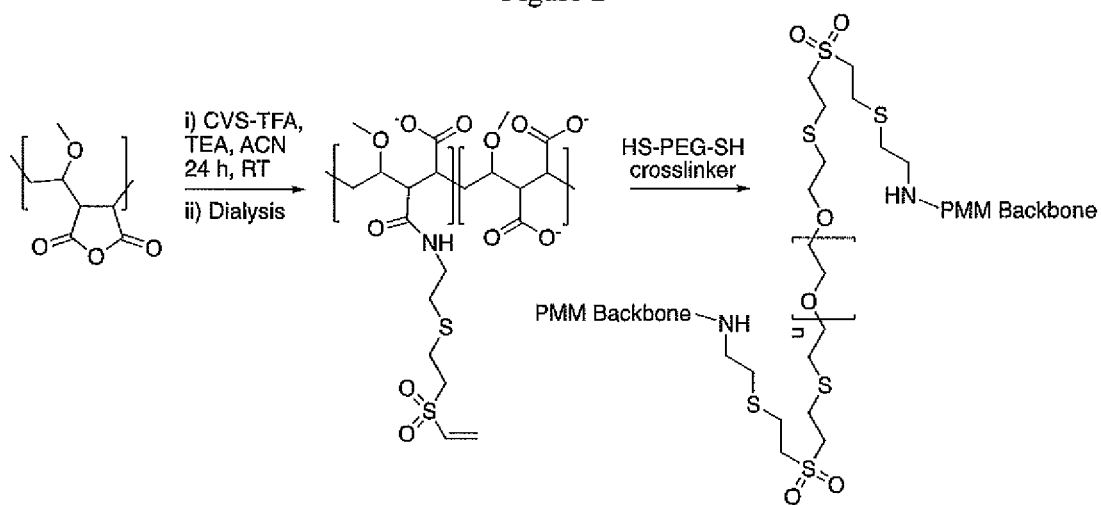
FIG. 2 shows PMM functionalization with CVS TFA and crosslinking of resulting PMM-CVS$_x$ polymer with HS-PEG-SH.

PMM-CVS by Polymer Modification. PMMAn was readily modified using CVS TFA or CVS HCl with TEA in acetonitrile (FIG. 2). An excess of TEA was used to ensure deprotonation of both CVS and of the maleamic acid formed by ring opening of the anhydride on PMM. A series of PMM-CVS with 10, 20 and 30 mol % functionalization were prepared, as illustrated below:

PMM-CVS$_{10}$ was prepared by dissolving PMMAn (0.250 g, 1.6 mmol andydride) in 10 mL of acetonitrile, followed by addition of triethylamine (TEA) (150 µL, 0.1088 g 1.1 mmol). CVS HCl (45 mg, 0.24 mmol, 15 mol % relative to anhydride groups on PMMAn) was dissolved in 5 mL 1:1 DMSO:acetonitrile and added dropwise over a few minutes to the stirring solution. The reaction was left mixing for 24 h at room temperature, followed by dialysis (Spectrapor, MWCO=3500 Da) against 4 L of 0.05 M NaCl for 1 day and then against 4 L distilled water for 3 days, changed daily. The dialyzed solution was then lyophilized, leading to the isolation of PMM-CVS10 as a white powder. $^1$H NMR in D$_2$O on a Bruker AV600 NMR Spectrometer was used to determine the degrees of functionalization, using the CVS vinyl signals ($\delta$ 6.25-7.0 3H), referenced to the methylene signal on the polymer backbone ($\delta$ 1.8, 2H). PMM-CVS20 and PMM-CVS30 were prepared in an analogous manner. Incorporation of CVS was 65 to 85% efficient (Table 2).

TABLE 2

| PMM-CVS$_{10}$ | | PMM-CVS$_{20}$ | | PMM-CVS$_{30}$ | |
|---|---|---|---|---|---|
| Target | Actual | Target | Actual | Target | Actual |
| 15 | 11 | 25 | 19 | 35 | 32 |

Several of the PMM-CVS were labelled with aminofluorescein to allow characterization of the gels via fluorescence microscopy.

Bulk Gels formed by reaction between PMM-CVS and PEG-dithiols in absence of Alginate. Gels were formed by mixing aqueous solutions of PMM-CVS$_X$ and HS-PEG-SH, using a 1:1 vinyl sulfone/thiol ratio. PMM-CVS$_x$ loadings of 2.5, 5 and 7.5% w/v for PMM-CVS with 10, 20 and 30 mol % CVS were prepared and characterized for swelling and Young's modulus. It was found that solutions of PMM-CVS$_{10}$ formed gels at loadings of 7.5% w/v or higher. PMM-CVS$_{20}$ and PMM-CVS$_{30}$ formed gels at all three loading percentages. PMM-CVS$_{45}$ was also prepared, but was found to be only sparingly soluble in water, and was hence not explored further.

Figure 3:
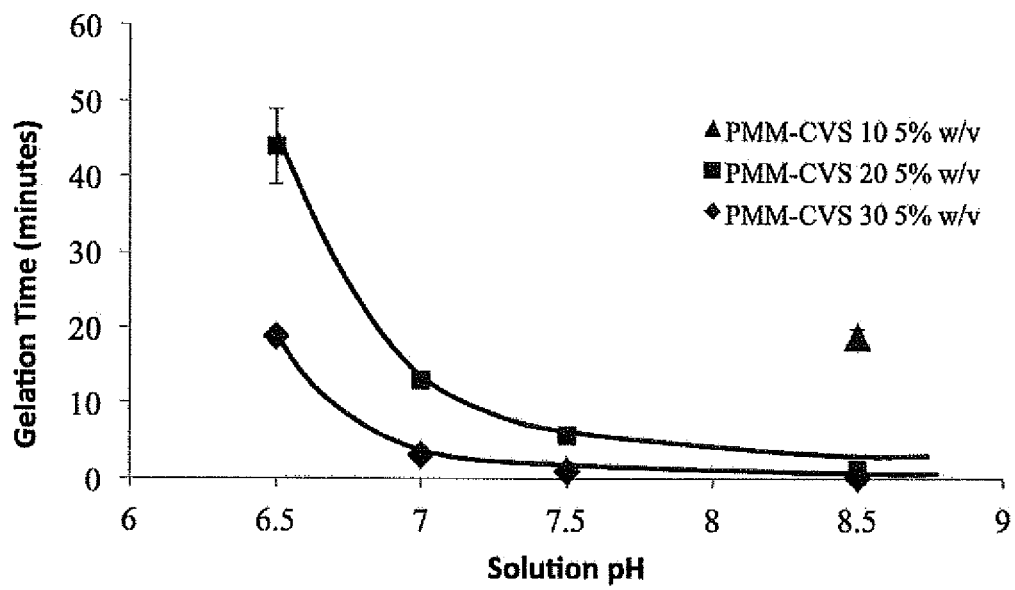
FIG. 3 shows a gelation time for 5% w/v PMM-CVS$_x$/HS-PEG-SH system, measured by horizontal tilt test, as a function of CVS content and pH.

Gelation time was measured at pH 6.5, 7.5 and 8.5 for PMM-CVS$_X$ gels prepared at 5% w/v. Gelation was defined as zero flow when the glass vial was tilted manually. The time required for gelation was strongly dependent both on the degree of functionalization of PMM-CVS$_x$ and on the pH of the systems. As shown in FIG. 3, the gelation time decreased as either the pH or functional percentage of CVS increased. For example, PMM-CVS$_{20}$ gelled within 5.6±0.5 min at pH 7.5, but took 44±5 min to gel at pH 6.5. With PMM-CVS$_{30}$, gelation times as short as one minute at pH 7.5, and a few seconds at 8.5 were seen. Cysteamine has a pKa value of 8.32, so the fraction of thiolates, and hence the reaction rate, are highly sensitive to small changes in pH in this range. No gelation was observed at pH 6.0 and below for PMM-CVS$_{20}$ and PMM-CVS$_{30}$, as well as pH 8.0 and below for PMM-CVS$_{10}$.

Figure 4:
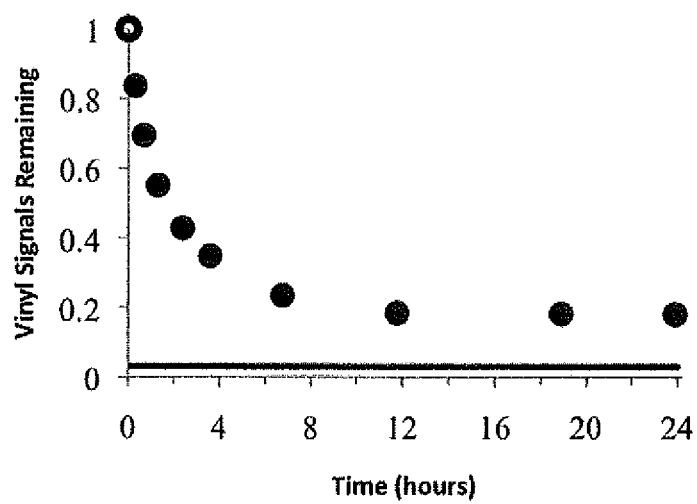
FIG. 4 shows a profile of remaining vinyl signals during gelation of 5% w/v PMM-CVS$_{30}$/HS-PEG-SH system at pH 7.1 determined by NMR integration. The reaction levels off at ca. 20% remaining vinyl signals, attributed to immobilization of the polymer-bound reactants.

$^1$H-NMR was used to measure the rate of reaction during gelation (FIG. 4), by monitoring the disappearance of vinyl signals at $\delta$ 6.4 and $\delta$ 6.75, due to thiol-ene conjugation (FIG. 2). The system investigated (5 wt % PMM-CVS30) had a gelation time of approximately 1 min, which corresponds to between 1-5% vinyl consumption, the equivalent of 0.5-1.5% repeat unit crosslinking, highlighting how few crosslink points are needed to form a gel. The profile levels off between 8-12 h, approaching 18% remaining vinyl groups, which is attributed to spatial isolation of some of the reactive groups. These residual groups provide an opportunity to post-functionalize the hydrogel, incorporating capping agents, adhesion proteins, labels, or other functional units.

Swelling Studies. Equilibrium hydrogel swelling is determined by two factors: the free energy of mixing between network and solvent and the net osmotic pressure of mobile ions, which are balanced by the swelling pressure of expansion. To assess swelling in these PMM-CVS gels, as-formed bulk gel disks were incubated in PBS buffer (10 mM phosphate, 154 mM NaCl, pH 7.4) at 37° C. for 7 days, with the resulting swelling ratios shown in FIG. 5. Gels prepared with 7.5% w/v PMM-CVS$_{10}$ exhibit more swelling than PMM-CVS$_{30}$ 2.5% w/v (FIG. 3), even though there are equivalent molar amounts of CVS present. This is attributed to the higher charge density and likely lower crosslink efficiency due to electrostatic repulsion for PMM-CVS$_{10}$.

Figure 5:
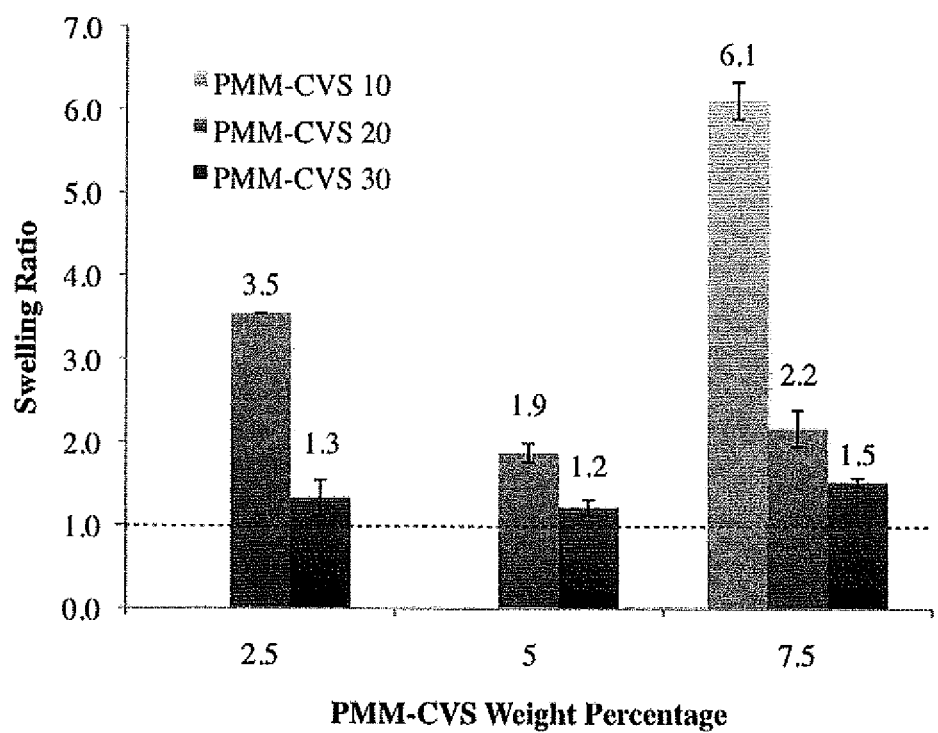
FIG. 5 shows equilibrium swelling ratios of PMM-CVS$_x$/HS-PEG-SH crosslinked hydrogels. Horizontal dashed line indicates swelling ratio of 1.

The horizontal dashed line in FIG. 5 represents an equilibrium swelling ratio of 1, indicating no additional swelling of the as-formed gels upon equilibration with excess PBS solution. Gels made from PMM-CVS$_{30}$ at all weight percentages showed swelling ratios close to 1. This is attributed both to the high crosslink density and the hydrophobicity of the CVS side group.

Mechanical Properties of Hydrogels. The stiffness of hydrogels can provide physical cues to anchorage dependent cells, influencing proliferation and differentiation potential. In order to investigate the stiffness of PMM-CVS$_x$ HS-PEG-SH hydrogels, crosslink density was varied through PMM-CVS$_x$ loading percentage and degree of functionalization, and the elastic modulus was measured by indentation. Moduli ranging from 1 to 141 kPa were observed, corresponding to the stiffness of a wide range of human tissues. The force-modulus relationship is described by Hertzian Theory for contact between a sphere and an elastically deformed incompressible material, where F is the force in mN, d is the depth of deformation, R is the radius of the indenter (R=0.85 mm), v is Poisson's ratio (assumed to be 0.5 for elastomeric hydrogels), and E is the Young's Modulus (Equation 1).

$$\text{Hertzian Theory: } F = \frac{E(4/3)R^{1/2}d^{3/2}}{1-v^2} \quad \text{Equation 1}$$

Figure 6:
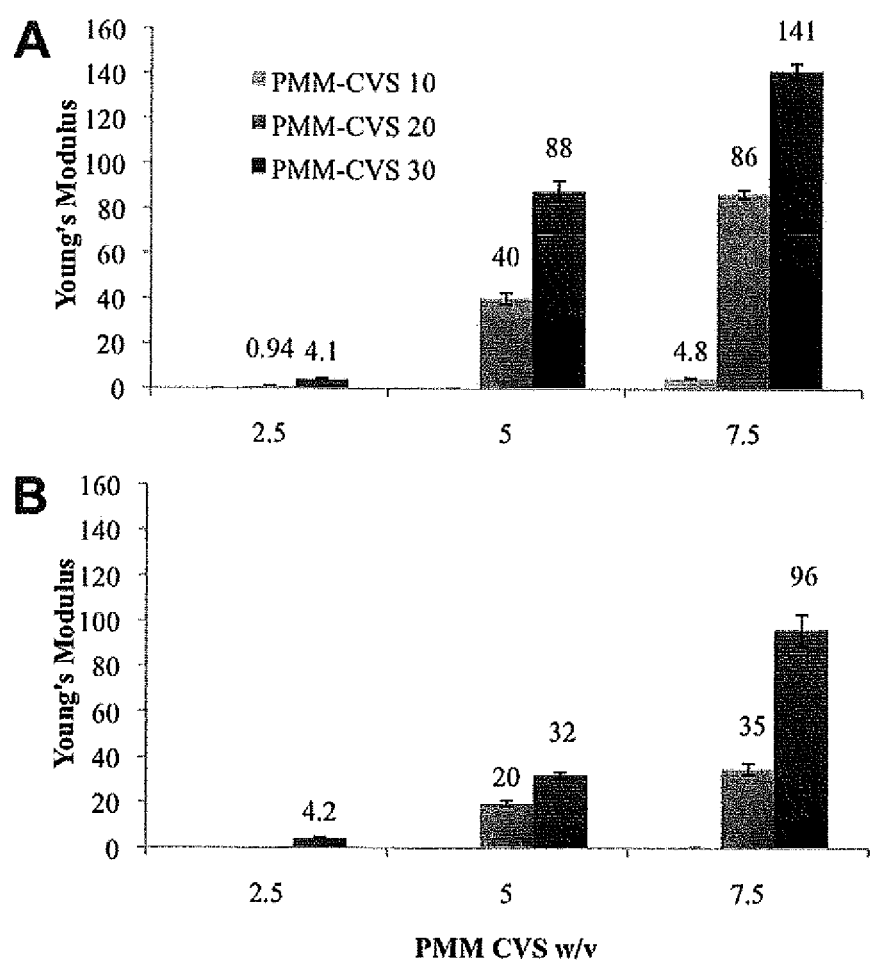
FIG. 6 shows Young's moduli for as-formed gels (A), and swollen gels (B), as a function of PMM-CVS functionalization, and loading percentage. All gels made with 1:1 vinyl sulfone/thiol.

Young's modulus, E, can be obtained from the initial slopes (d≤0.3 mm) of the linear fits in the force versus strain plots, where the linear Hertzian theory is considered reliable. Measurements were done both before (FIG. 6a), and after swelling for 7 days, in 10 mM PBS buffer (FIG. 6b). For the as-formed gels, the modulus increased both with the degree of PMM-CVS functionalization and with the percent polymer-loading, as anticipated. The gels made with 7.5% w/v PMM-CVS$_x$, showed a stepwise increase in Young's modulus with increasing CVS content: PMM-CVS$_{10}$ (4.8 kPa), PMM-CVS$_{20}$ (86 kPa) and PMM-CVS$_{20}$ (141 kPa). The Young's modulus increases with polymer loading from 4.1 kPa (2.5% w/v) to 141 kPa (7.5% w/v), at constant functionalization (PMM-CVS$_{30}$). These trends allow the mechanical properties of the PMM-CVS$_x$ HS-PEG-SH system to be tuned within a large range, by altering either the functional or weight percent. After swelling, some gels (PMM-CVS$_{20}$ 2.5% w/v and PMM-CVS$_{10}$ 5% and 7.5% w/v) became too soft for the modulus to be measured with the indenter.

Figure 7:
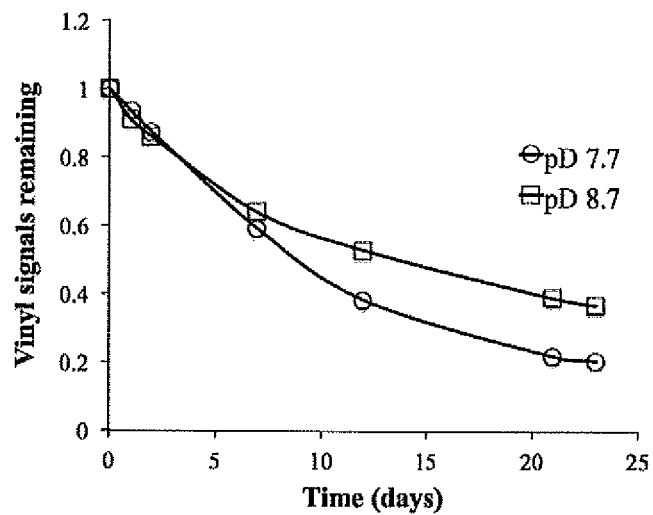
FIG. 7 shows disappearance of distal proton signals (86.40) in HEPES buffer (pD 7.7 and pD 8.7) over time. Hydration of the vinyl sulfone moiety occurs orders of magnitude more slowly than the thiol-ene crosslinking reaction.

Hydrolytic Stability of PMM-CVS. While thioether linkages are generally considered to be stable under physiological conditions, it was of interest to determine the stability in aqueous media of the vinyl sulfone moieties in the current system (FIG. 7). Literature reports routinely describe the stability of vinyl sulfone in water as one of the strengths of using this group for applications such as protein modification. PMM-CVS$_{30}$ solutions in D$_2$O at pD 7.7 and 8.7 were stored for 3 weeks at 37° C., and monitored at intervals by $^1$H NMR. Spectral changes were only seen for signals relating to the pendant vinyl sulfone, and were interpreted as hydration of the vinyl group. The disappearance of the vinyl signals was found to be several orders of magnitude slower than gelation times, indicating that such side reactions of CVS do not interfere or compete with gelation even at higher pH.

Post Modification of Residual Vinyl Sulfone Units. Post modification of reactive polymers and hydrogels has been demonstrated as an effective method to cap reactive groups, and incorporate functional biomolecules. Specifically, the use of thiol-ene Michael addition chemistry has gained interest in post functionalization, and has been shown to permit incorporation of VEGF and RGD in PEG-based vinyl sulfone- and maleimide- containing hydrogels.

Figure 8:
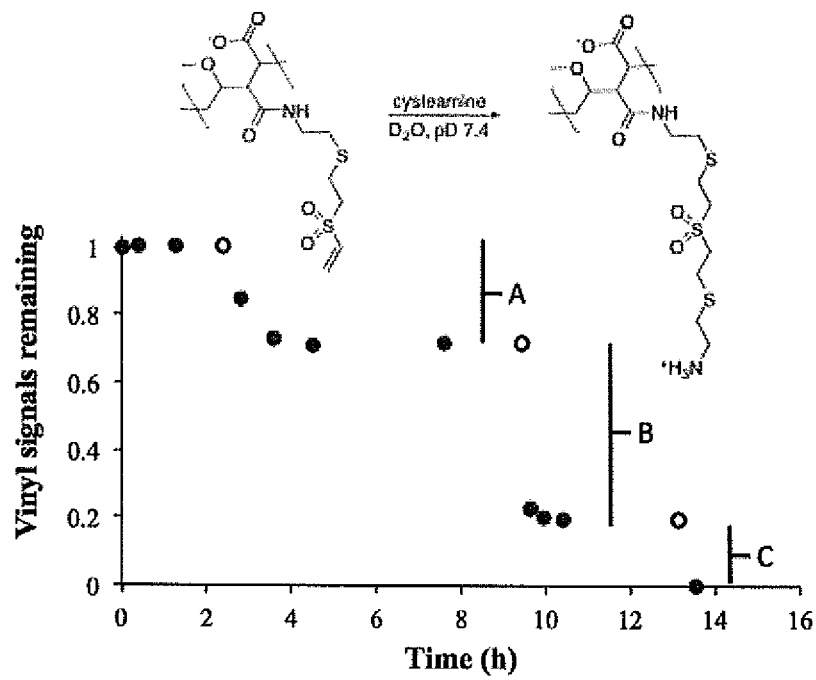
FIG. 8 shows stepwise post-functionalization of residual functional units in PMM-CVS$_{30}$/HS-PEG-SH gel. Hollow circle indicates injection time of cysteamine capping agent.

A simple, proof-of-concept method was used to post-functionalize an as-formed PMM-CVS$_{30}$/HS-PEG-SH hydrogel using cysteamine, a small thiol containing molecule (FIG. 8). The gel was crosslinked using a 0.5:1 ratio of thiol:CVS, in order to have residual CVS available for post-functionalization. In order to determine the degree of post functionalization via the addition of small molecules, an internal 1H NMR standard was used during post-functionalization. To integrate the vinyl region of the post functionalized spectrum, both peaks (δ6.8 and δ6.4) were analyzed separately, leaving out the vinylic impurity (δ6.65). The internal standard, PUT, was seen at δ7.4. The first aliquot (FIG. 8, A) of capping agent was added at a 36% capping ratio, leading to a 28% deactivation. This was then followed with a larger, 66% aliquot (FIG. 8, B) leading to a 52% deactivation, followed by capping of all residual vinyl groups (FIG. 8, C). The stepwise fashion of post-functionalization highlights the possibility for multi-functional addition in varying ratios with good efficiency, leading to a fully capped hydrogel.

In Vitro Cytotoxicity. In vitro cytotoxicity of PMM-CVS$_{20}$/HS-PEG-SH hydrogels at 5% w/v to encapsulated 3T3 fibroblasts was evaluated using a live/dead assay. Live cells fluoresce at 515 nm (green) due to the enzymatic conversion of non-fluorescent calcein AM to the highly fluorescent calcein, which is retained within live cells. EthD-1 enters cells with damaged membranes and binds to nucleic acids, undergoing a significant increase in fluorescence, visible at 635 nm (red) in dead cells, while being excluded by the intact plasma membrane of live cells. Cell viability in the hydrogels was found to be similar to the control, at 98±1% for the PMM-CVS$_{20}$ hydrogels, and 98±1% for the control wells after 24 h of incubation. These results indicate that hydrogels composed of PMM-CVS did not exhibit cytotoxicity towards the encapsulated cells and further indicate their biocompatibility and potential as platform materials for biomedical applications including cell encapsulation for cell-based therapies.

Figure 9:
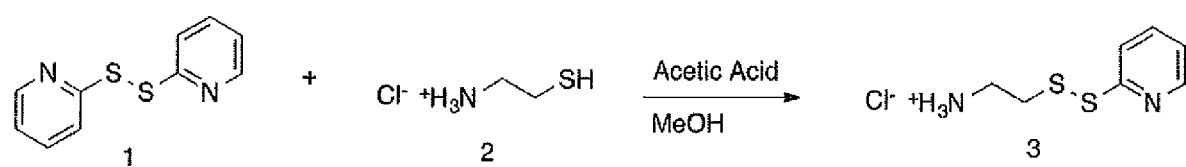
FIG. 9 shows the synthesis of S-(2-aminoethylthio)-2-thiopyridine (3) ft=thiopyridyl disulfide (1) and cysteamine (2).

Synthesis of S-(2-aminoethylthio)-2-thiopyridine. Thiopyridyl disulfide was reacted with cysteamine HCl in methanol to produce S-(2-aminoethylthio)-2-thiopyridine (FIG. 9). Acetic acid was used to ensure full protonation of cysteamine. Impurities, such as unreacted thiopyridyl disulfide, were removed from the product using precipitation in diethyl ether. Following isolation by vacuum filtration, S-(2- aminoethylthio)-2-thiopyridine (SPy) was obtained with a yield of 73%. The product was characterized using $^1$H-NMR, and distinct pyridyl ($\delta$7.2, 1H, t; $\delta$7.6, 1H, d; $\delta$7.7, 1H, t; $\delta$8.3, 1H, d) and ethylene ($\delta$3.0, 2H, t; $\delta$3.2, 2H, t) peaks were observed.

Figure 10:
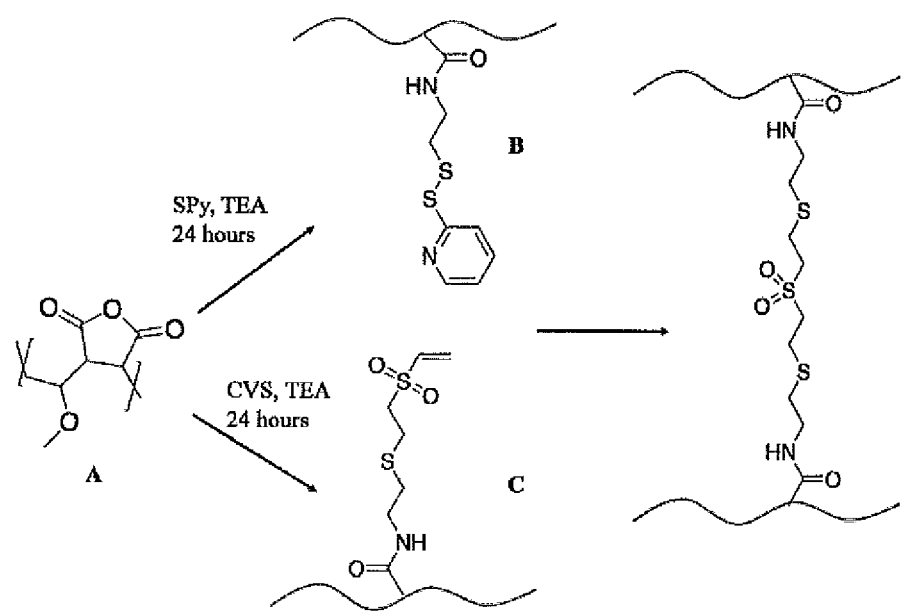
FIG. 10 shows functionalization of PMMAn (A) to form PMM-CVS$_x$ (C) and PMM-SPy$_x$ (B), followed by TCEP addition to form a crosslinked hydrogel.

Synthesis of SPy-Functionalized PMM. PMMAn was functionalized with SPy at 10, 20 and 30% functional group loadings (FIG. 10). TEA was used to ensure deprotonation of CVS and maleamic acid formed by ring opening of the anhydride group on PMMAn.

The synthesis of PMM-SPy with 10 mol % SPy is illustrated below: PMM-SPy10 was prepared by dissolving PMMAn (0.250 g, 1.6 mmol anhydride) in 10 mL of acetonitrile, followed by addition of triethylamine (TEA) (150 µL, 0.1088 g 1.1 mmol). SPy (53.6 mg, 0.24 mmol, 15 mol % relative to anhydride groups on PMMAn) was dissolved in 5 mL 1:1 DMSO:acetonitrile and added dropwise over a few minutes to the stirring solution. The reaction was left to mix for 24 h at room temperature, followed by dialysis (Spectrapor, MWCO=3500 Da) against 4 L of 0.05 M NaCl for 1 day and then against 4 L distilled water for 3 days, changed daily. The dialyzed solution was then lyophilized, leading to the isolation of PMM-SPy10 as a white powder. $^1$H NMR in $D_2O$ on a Bruker AV600 NMR Spectrometer was used to determine the degrees of functionalization, using the SPy vinyl signals ($\delta$ 7.0-8.4, 4H), referenced to the methylene signal on the polymer backbone ($\delta$ 1.8, 2H). PMM-SPy20 and PMM-SPy30 were prepared in an analogous manner.

Figure 11:
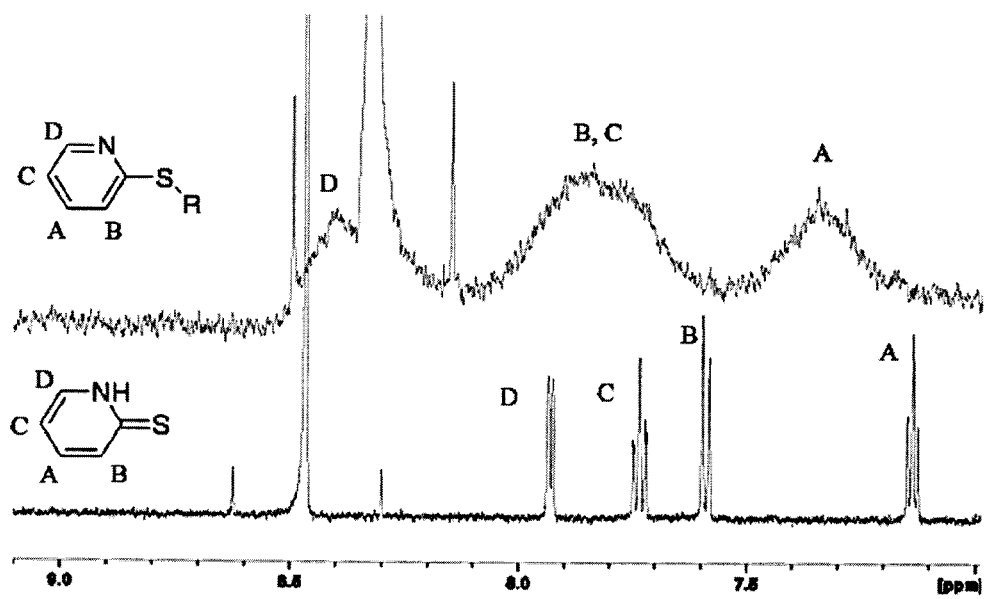
FIG. 11 shows $^1$H-NMR spectra of PMM-SPy$_{20}$ before TCEP addition (red) and 8 minutes after TCEP addition (blue). Formic acid internal standard peaks ($\delta$8.3, red; $\delta$8.5, blue) can be seen.

NMR Study of TCEP Degradation of Disulfide Bonds in PMM-SPy$_x$. $^1$H-NMR of a PMM-SPy$_{20}$ solution before and after TCEP addition were taken in an attempt to quantify the rate of TCEP reduction of the disulfide bond in SPy. Monitoring of pyridyl peaks on the NMR spectra (FIG. 11) indicated that TCEP had deprotected the reactive thiol completely before the first time point was measured, at 8 minutes. The pyridyl group produced broad peaks before its removal from the polymer backbone. After TCEP addition, sharp and distinct peaks from 2-pyridinethione are seen.

PMM-CVS$_x$/HS-PEG-SH/Alginate Composite Beads. Solutions of 1.125% w/v sodium alginate and containing different concentrations of PMM-CVS$_x$ were extruded through a needle and droplets were sheared off using coaxial annular air flow, then collected in a pH 7.4 buffered calcium ion gelling bath. The ionic crosslinking of alginate in the presence of $Ca^{2+}$ formed a gel scaffold that entrapped the PMM-CVS$_x$ within the forming calcium alginate beads. Subsequent exposure of these beads to solutions containing HS-PEG-SH led to in-diffusion of the PEG-dithiol and covalent crosslinking by Michael addition between PMM-CVS groups and thiol groups. The polyanionic nature of PMM-CVS$_x$ allowed for efficient entrapment of this polymer within the calcium alginate bead before covalent crosslinking, as the anionic PMM backbone interacts with $Ca^{2+}$ cations.

After 24 hours in solution containing 1000 Da HS-PEG-SH at ratios between 1:1 to 4:1 of thiol:CVS, removal of $Ca^{2+}$ with 70 mM sodium citrate did not result in bead dissolution. The PMM-CVS$_x$/HS-PEG-SH crosslinked beads retained their spherical shape after calcium chelation and subsequent alginate liquefaction, except for two bead compositions (shown in FIG. 12 as a swelling ratio of 0). The ratio of bead diameter one hour after, and just before, extraction of calcium with citrate was defined as swelling ratio and used as an indicator of the crosslink density within the bead.

Figure 12:
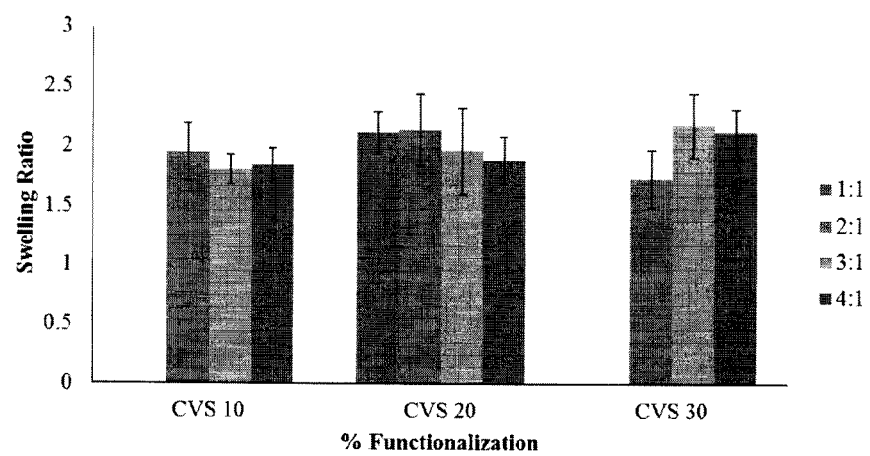
FIG. 12 shows the swelling ratio of 1.0% w/v MVG alginate PMM-CVS$_x$/1000 Da HS-PEG-SH beads over a series of functional percentages and crosslinker concentrations.

As seen in FIG. 12, swelling ratios for PMM-CVSx/HS-PEG-SH gels did not depend on functionalization percentage or crosslinker ratio. The two exceptions to this, PMM-CVS$_{10}$ with 1:1 HS-PEG-SH and PMM-CVS$_{30}$ with 1:1 HS-PEG-SH, were insufficiently crosslinked and could not maintain a cohesive bead after the alginate scaffold was removed. The fact that gels were formed with PMM-CVS20 is attributed to the higher crosslink density achievable with this polymer as compared with PMM-CVS10, and the lower hydrophobicity compared to PMM-CVS30, while a ratio of greater than 1:1 PMM-CVS$_{10}$ to HS-PEG-SH provides sufficient crosslinking.

Figure 13:
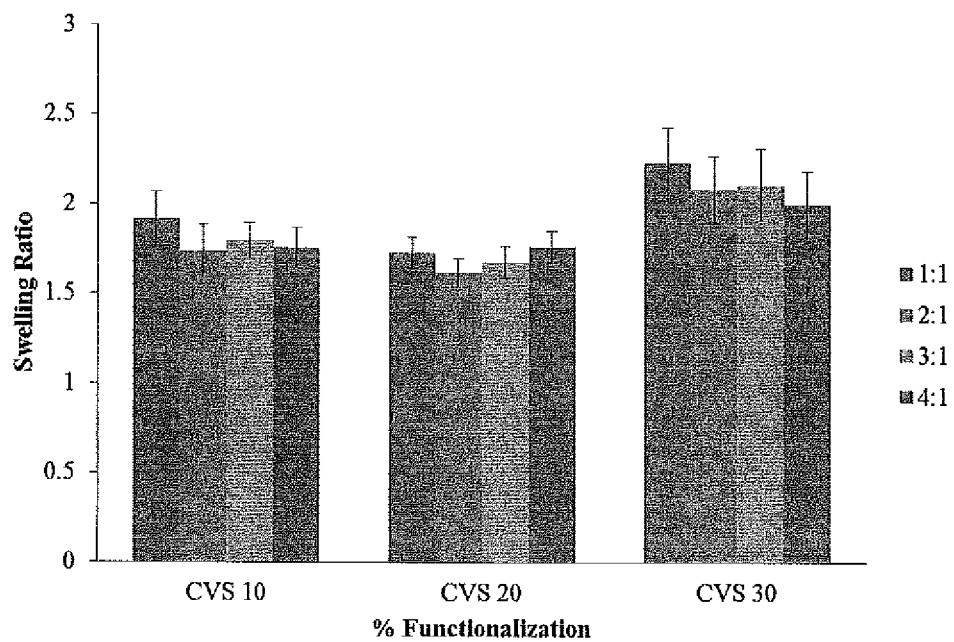
FIG. 13 shows the 1 h and 24 h swelling ratios of PMM-CVS$_{20}$-r/PMM-SPy$_{20}$/alginate beads as a function of time. Time measurements began once beads had been formed in gelling bath for the study of beads left in TCEP gelling bath. Time measurements began after washing for the study of beads left in TCEP for 15 minutes.

The swelling ratio of calcium alginate beads containing 1% w/v PMM-CVS$_x$ and exposed to 8000 Da HS-PEG-SH crosslinker were also determined. The capsules remained intact after $Ca^{2+}$ removal by citrate at all CVS functionalization percentages and thiol:CVS ratios and again did not display a significant difference in swelling ratio (FIG. 13).

Figure 14:
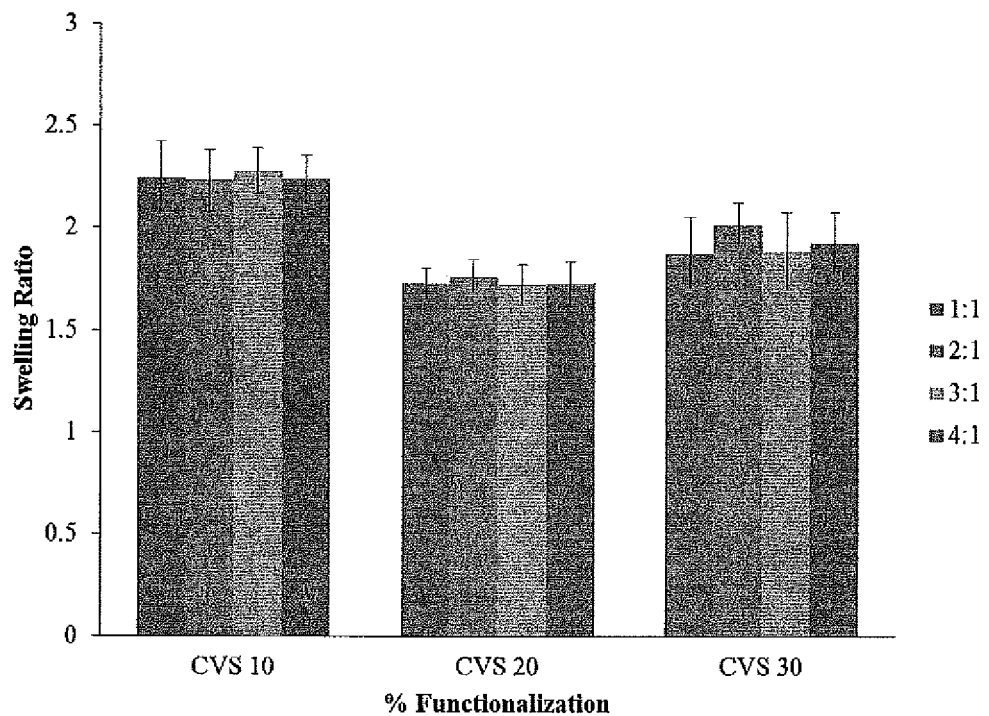
FIG. 14 shows the swelling ratio of PMM-CVS$_x$/PMM-SPy$_x$ beads over a series of functional group percentages and polymer concentrations.

Calcium alginate beads with 2% w/v PMM-CVS$_x$ and exposed to solutions containing a 1000 Da HS-PEG-SH crosslinker also maintained their capsule integrity at all CVS percent functionalization or thiol:CVS concentration ratio (FIG. 14). These beads showed swelling ratios decrease from PMM-CVS$_{10}$ beads, to PMM-CVS$_{20}$ and PMM-CVS$_{30}$ beads. The ratio of thiol:CVS concentration had no effect on swelling ratio.

Overall, the swelling ratios of PMM-CVSx/HS-PEG-SH/alginate beads did not vary strongly with concentration and degree of functionalization of the PMM-CVSx. This is attributed to the sequestration to the PMM-CVSx within the calcium alginate gel, which is thought to limit complete crosslinking reaction with HS-PEG-SH.

While the resulting capsules demonstrate rapid thiol-ene reaction between PMM-CVSx and in-diffusing HS-PEG-SH, better control over the resulting network may be obtained by co-entrapping two PMM-based polymers, functionalized with CVS, and protected thiol, respectively. Subsequent triggered deprotection of the protected thiol by reaction with low molecular weight cyto-compatible reducing agents may then be used to initiate covalent crosslinking between the two PMM polymers without the need for either to diffuse into or through the calcium alginate gel beads. In addition, co-sequestration of the two reactive PMM polymers within the nanometer sized pores of the calcium alginate gel should lead to local increases of their concentrations, which should again increase crosslinking rate and efficiency, compared to equivalent bulk thiol-ene crosslinking reactions.

Figure 15:
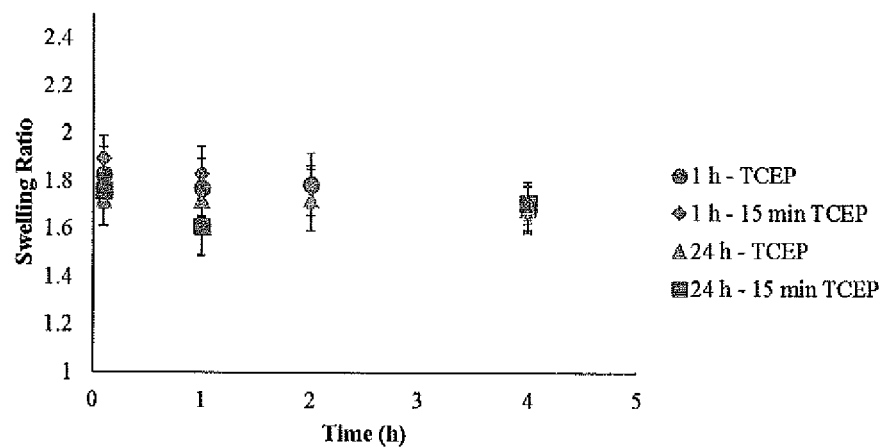
FIG. 15 shows confocal microscope images of 1% PMM-CVS$_{20}$-r/1% PMM-SPy$_{20}$/alginate beads at time points A) before citrate addition, B) 1 minute after citrate addition, C) 2 minutes after citrate addition, D) 20 minutes after citrate addition, E) 40 minutes after citrate addition and, F) 60 minutes after citrate addition.

Optimization of PMM-CVS$_x$/PMM-SPy$_x$/Alginate Composite Beads with simultaneous gelation and crosslinking (A). Droplets of a 1% w/v PMM-CVS$_{20}$-r, 1% PMM-SPy$_{20}$ and 1.125% sodium alginate solution were gelled in a HEPES-buffered gelling bath containing TCEP. The covalent crosslinking reaction between PMM-CVS$_x$ and PMM-SPy$_x$ was facilitated by the reduction of the disulfide bond in SPy to remove the pyridyl protecting group. The thiol-functionalized PMM was then available to undergo a Michael addition with cysteamine vinyl sulfone on PMM-CVSx. The pH of the $CaCl_2$ gelling bath was kept between pH=7.4-7.8 to promote the base-catalyzed Michael addition, as well as to mimic physiological conditions. Beads were left in TCEP solution for 4 minutes, 1 h, 2 h or 4 h. They were then washed with gelling bath to remove residual TCEP, and their diameters determined. Finally they were treated with citrate to extract calcium, and 1 h and 24 h bead swelling ratios were determined. A separate set of beads was allowed to gel in TCEP-containing gelling bath for 15 minutes, then washed and left in HEPES-buffered gelling bath for 4 minutes, 1 h, 2 h or 4 h. 1 h and 24 h swelling ratios were again measured (FIG. 15).

There was no significant difference in the swelling ratios of these sets of beads, regardless of the time spent in TCEP solution, or the time spent in citrate solution. This suggests that the polymer network reaches maximum covalent crosslinking within 4 minutes of exposure to TCEP. This crosslinking reaction is much faster than that observed for the PMM-CVS$_x$/HS-PEG-SH system described above, where 24 h were allowed for HS-PEG-SH diffusion into the bead and crosslinking.

PMM-CVS$_{20}$-r/PMM-SPy$_{20}$ beads gelled in the absence of TCEP and stored for 24 h completely dissolved upon citrate extraction of calcium, verifying that TCEP-deprotection of SPy is required for covalent crosslinking.

Figure 16:
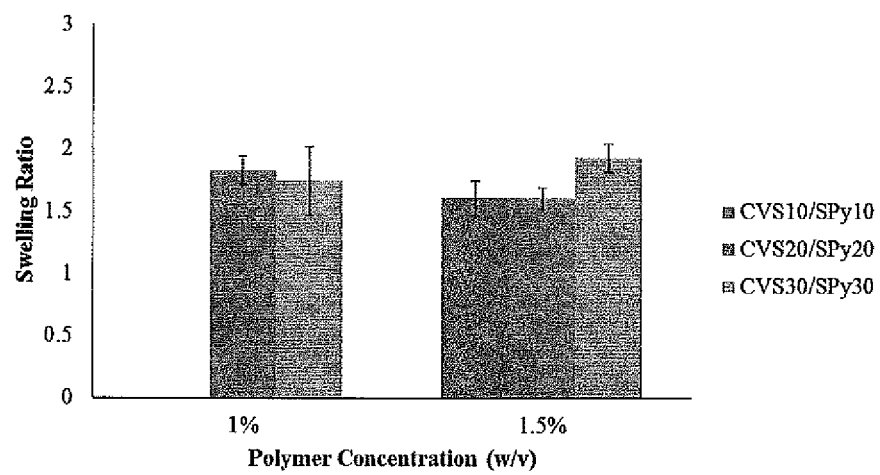
FIG. 16 shows confocal microscope images of PMM-CVS$_{20}$-r/PMM-SPy$_{20}$ beads A) 1 minute after photobleaching and B) 60 minutes after photobleaching. The photobleached area is indicated with a white arrow in both images.
Figure 17:
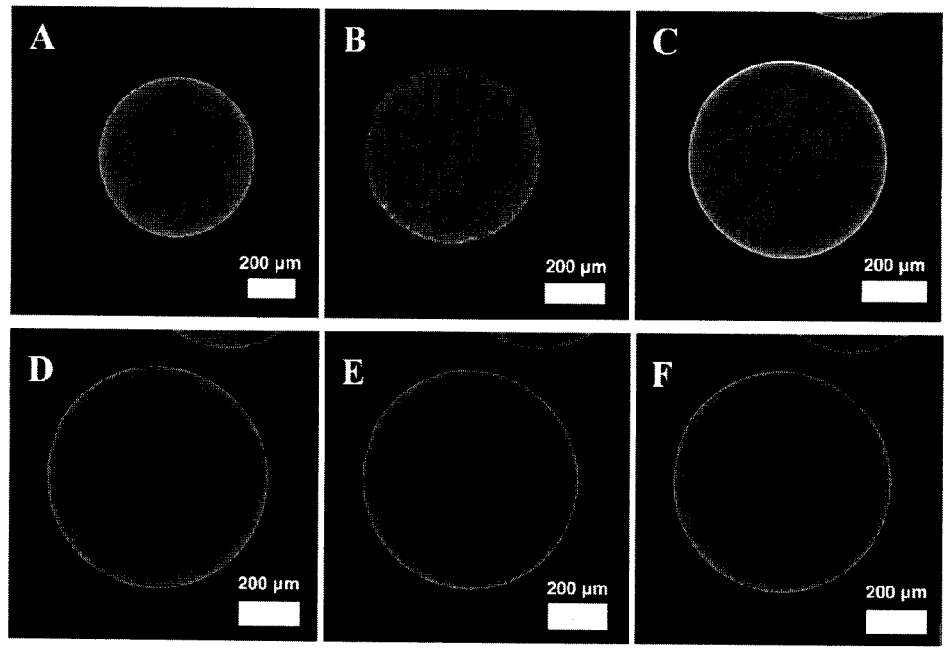
FIG. 17 shows swelling ratios of 1% w/v PMM-CVS$_x$ beads with varying 8000 Da HS-PEG-SH crosslinking concentration.

PMM-CVS$_x$/PMM-SPy$_x$/Alginate Composite Beads with simultaneous gelation and crosslinking (B). A solution of 1.125% w/v sodium alginate with variable PMM-CVS$_x$ and PMM-SPy$_x$ concentrations was extruded through a needle and droplets were sheared off using coaxial air flow, then collected in a HEPES-buffered calcium ion gelling bath containing TCEP, as described above. After 15 minutes in TCEP-containing HEPES-buffered gelling bath, the beads were washed with HEPES-buffered gelling bath and allowed to sit for 1 h. The beads maintained capsule integrity after citrate addition, with only one composition dissipating in solution. Swelling ratios (FIG. 16) of these beads made at various polymer concentrations and functional group percentages were calculated using images taken on a Nikon eclipse Ti inverted fluorescent microscope and Nikon Eclipse Ti confocal microscope (FIG. 17).

Tunability of the swelling ratio of capsules is seen for this system at 1.5% w/v polymer concentration. There is a significant increase in swelling ratio as the percent functionalization of CVS and SPy increases from 20% to 30%. It is hypothesized that the hydrophobicity of CVS-functionalized PMM could drive nano-phase separation between PMM-CVS$_x$ and alginate in capsules. Increased phase separation would increase crosslink density in highly concentrated regions of PMM-CVS$_{30}$ and PMM-SPy$_{30}$ but reduce overall crosslink efficiency between polymer-rich regions.

PMM-CVS$_x$/PMM-SPy$_x$/Alginate Composite Beads with sequential gelation and crosslinking. A solution of sodium alginate (1.2% w/v) in HEPES buffered saline (800 μL, 50 mM HEPES, pH 7.4) was added to a 200 μL solution of PMM-CVS$_x$ (5-15 mg, 0.5- 1.5% w/v) and PMM-SPy$_y$ (5-15 mg, 0.5-1.5% w/v) in HEPES buffered saline, to give final concentrations of 1% w/v sodium alginate, and 1% w/v each of PMM-CVS$_x$ and PMM-SPy$_y$. The solution was briefly vortexed to ensure complete mixing, then air-sheared through a 27 gauge needle into 50 mL of HEPES buffered gelling bath containing 50 mM HEPES, 0.45% w/v (77 mM) NaCl and 1.1% w/v (100 mM) CaCl$_2$ (pH 7.4) using a syringe pump set to a flow rate of 0.5 mL/min. A dense suspension of the resulting beads (ca. 1 mL) were collected, the gelling bath was removed and replaced with gelling bath containing TCEP (20× molar excess compared to units of SPy, 50 mM HEPES, 0.45% w/v (77 mM) NaCl, 1.1% w/v (100 mM) CaCl$_2$, pH 7.4) as summarized in Table 3 for the various polymer loadings. After 10 minutes in the TCEP solution, the supernatant was removed and the beads were rinsed 1× with 5 mL of HEPES buffered gelling bath, followed by 2× saline and stored at 37° C. in saline solution. Bead diameter was measured (n=20) using an upright optical microscope on brightfield and a 5× objective lens and was relatively constant.

TABLE 3

| Polymer | Loading % | mol S-S | mol TCEP | mass TCEP |
|---|---|---|---|---|
| CVS10/SPy10 | 0.5% | $2.65 \times 10^{-6}$ | $5.3 \times 10^{-5}$ | 15.2 mg |
| CVS10/SPy10 | 1.0% | $5.30 \times 10^{-6}$ | $1.06 \times 10^{-4}$ | 30.4 mg |
| CVS10/SPy10 | 1.5% | $7.95 \times 10^{-6}$ | $1.59 \times 10^{-4}$ | 45.6 mg |
| CVS20/SPy20 | 0.5% | $4.86 \times 10^{-6}$ | $9.5 \times 10^{-5}$ | 27.9 mg |
| CVS20/SPy20 | 1.0% | $9.73 \times 10^{-6}$ | $1.90 \times 10^{-4}$ | 55.8 mg |
| CVS20/SPy20 | 1.5% | $14.60 \times 10^{-6}$ | $2.85 \times 10^{-4}$ | 83.7 mg |
| CVS30/SPy30 | 0.5% | $6.5 \times 10^{-6}$ | $1.35 \times 10^{-4}$ | 38.7 mg |
| CVS30/SPy30 | 1.0% | $1.30 \times 10^{-5}$ | $2.70 \times 10^{-4}$ | 77.3 mg |
| CVS30/SPy30 | 1.5% | $1.95 \times 10^{-5}$ | $4.05 \times 10^{-4}$ | 116.0 mg |

Effect of TCEP concentration and exposure time on bead crosslinking. Beads composed of 1% w/v alginate and 1% w/v each PMM-CVS$_{20}$ and PMM-SPy$_{20}$ were prepared using the standard procedure, detailed above. The gelling bath was removed 10 minutes after extrusion was complete and replaced with TCEP in HEPES-buffered gelling bath in 10, 20, 30, 40 and 50× molar excess TCEP relative to SPy units as summarized in Table 4, in 50 mL of gelling bath. At set timepoints, 0.1 mL of beads were removed from this TCEP gelling bath and rinsed once with 1 mL HEPES-buffered gelling bath and twice with 1 mL saline (0.9% NaCl). Bead diameters were measured on a microscope set to brightfield (n=20). The supernatant was then removed and replaced with 1 mL of sodium citrate (70 mM) and incubated at 37° C. for 1 h. The bead diameters were measured post-citrate extraction (n=20) and the ratio was used to determine the degree of swelling. Control beads that were not exposed to TCEP were also rinsed with once with 1 mL HEPES-buffered gelling bath and 2×1 mL saline, incubated, and then treated with sodium citrate.

TABLE 4

| xs TCEP | mol TCEP | mass TCEP | Volume | Concentration |
|---|---|---|---|---|
| 10x | 0.0972 mmol | 27.9 mg | 50 mL | 1.94 mM |
| 20x | 0.194 mmol | 55.8 mg | 50 mL | 3.88 mM |
| 30x | 0.292 mmol | 83.7 mg | 50 mL | 5.84 mM |
| 40x | 0.389 mmol | 111.6 mg | 50 mL | 7.78 mM |
| 50x | 0.486 mmol | 140.0 mg | 50 mL | 9.72 mM |

It was found that for a 10× excess of TCEP, the exposure time made a significant difference in the swell ratio, with swelling decreasing as the beads were exposed to TCEP for longer times. A 20× excess was found to have a similar impact on swelling regardless of the amount of time beads spent exposed to the TCEP solution, indicating that at this concentration, TCEP rapidly reduced the disulphide linkages and allowed for covalent crosslinking. As the TCEP concentrations increased to 30-50× excess, the beads exhibited a greater degree of swelling that increased with TCEP exposure time. Based on these findings, a molar excess of 20× TCEP was selected for crosslinking beads due to disulphide cleavage being complete within 10 minutes, allowing for short exposure time of beads to TCEP solutions.

Measurement of Covalent Crosslinking Efficiency using Sodium Citrate. Beads composed of 1% alginate and varying loading percentages of PMM-CVS/SPy were prepared as described above, and treated with 20× excess of TCEP for 10 minutes. TCEP supernatant was then removed and beads were rinsed 1× with 5 mL HEPES-buffered gelling bath, followed by 2×10 mL saline. Bead diameters were measured using a microscope on transmitted light mode (n=20). Approximately 300 beads were then placed into a glass vial, and the supernatant was removed. The beads were rinsed with 1 mL of sodium citrate, which was then removed and replaced with 3 mL of fresh sodium citrate. The beads were gently agitated for 4 h and then observed and measured using the transmitted light setting on the microscope, or a confocal microscope (n=20).

Beads composed of 0.5% PMM-CVS10/SPy10 did not withstand calcium chelation, indicating that there were not enough functional groups present to provide adequate amounts of covalent crosslinking. While beads composed of 1.0% and 1.5% w/v PMM-CVS10/SPy10 did not experience complete dissolution, they did swell significantly, and many beads broke. Beads composed of 0.5, 1.0 and 1.5% w/v PMM-CVS20/SPy20 all remained intact after citrate treatment, although the 0.5% w/v beads became weak and easily deformable. All three compositions remained intact for PMM-CVS30/SPy30, and the opacity apparent in the 1.0% and 1.5% w/v beads decreased after citrate treatment, perhaps due to decreased charge shielding and increased swelling.

Equilibrium Permeability of Beads Using Fluorescently Labelled Dextrans. The permeability of PMM-CVS$_x$/SPy$_y$ beads was investigated using fluorescently labelled dextrans of varying molecular weights (10 kDa, 70 kDa, 250 kDa, 500 kDa). The beads were prepared as described above and allowed to incubate at 37° C. for 24 h to ensure complete covalent crosslinking of the beads. Approximately 150 µL of concentrated bead suspension was removed and placed into a 2 mL conical vial. 1 mL of sodium citrate (70 mM) was added to the suspension and the vial was gently agitated then stored at 37° C. for 24 h to ensure complete liquefaction of the calcium alginate template. Approximately 50 beads were then removed from the vial and placed into a well in a 96-well plate and 100 µL of fluorescently labelled dextran (0.05% w/v) in HEPES buffered saline was added. Beads were allowed to incubate at 37° C. for 24 h. Beads were imaged using a Nikon confocal microscope and the fluorescent intensity from approximately the central 25% of the beads (n=4), as well as from the surrounding fluorescent solutions (n=4), were obtained using NIS-Elements (Nikon) software and the ratio was determined.

Results—Indiffusion of fluorescently-labelled dextrans to determine bead permeability. Hydrogel beads serve as a semi-permeable membrane, providing protection for encapsulated cells. The beads must allow for in-diffusion of oxygen and nutrients, and out-diffusion of therapeutic agents such as insulin to the surrounding environment. The beads should also provide immune-protection to encapsulated cells by excluding antibodies and cytokines. Beads composed of 0.5% w/v PMM-CVS10/SPy10 were insufficiently crosslinked to withstand the citrate challenge. Beads composed of 1.0% and 1.5% w/v PMM-CVS10/SPy10 were weak and experienced some breakage. Broken beads were not used to measure permeability. Polymer loading percentage was found to have a greater effect on bead porosity than functionalization percentage. This fits with the swell ratio data that indicates that swelling is a function of loading percentage and not functionalization percentage which makes sense as porosity is a function of swelling. Beads composed of PMM-CVS10/SPy10 and PMM-CVS20/SPy20 showed similar permeabilities to that of standard alginate beads, indicating that the reactive polymers retain similar porosity upon liquefaction of the alginate scaffold. There was seen to be considerable indiffusion of 10 kDa dextran-f, and an increase in partial exclusion as dextran-f MW increased. Beads composed of 0.5% and 1.0% PMM-CVS30/SPy30 also had similar porosities to alginate beads. However, at 1.5% polymer loading, beads demonstrated partial exclusion of dextran-f, perhaps due to the somewhat hydrophobic nature of the polymer scaffold.

Kinetic Permeability of Beads using Fluorescently Labelled Dextran. Beads composed of 1% w/v alginate and 1.0% w/v PMM-CVS20/SPy20 were treated with sodium citrate as described above to liquefy the alginate scaffold. Four times 50 beads were then removed from the citrate solution and placed into four wells in a 96-well plate and 100 µL of fluorescently labelled dextran (0.05% w/v; 10 kDa, 70 kDa, 250 kDa, 500 kDa) in HEPES buffered saline was added, each to one well. Beads were imaged at set time points using a Nikon confocal microscope and the fluorescent intensity from approximately the central 25% of the beads (n=4), as well as from the surrounding fluorescent solutions (n=4), were obtained using NIS-Elements (Nikon) software and the ratio was determined.

Results—Kinetic Permeability Study. A kinetic permeability test was used to measure the rate of indiffusion of fluorescently labeled dextrans of varying molecular weights. It was seen that 10 kDa dextran-f is able to rapidly diffuse into the beads, reaching equilibrium within 20 minutes. This suggests that oxygen and other small metabolites would also rapidly diffuse in and out of the matrix beads. 70 kDa and 250 kDa dextran-f diffuse into the beads more slowly, and reach equilibrium around 1 h, while 500 kDa dextran-f exhibits even slower indiffusion.

Figure 18:
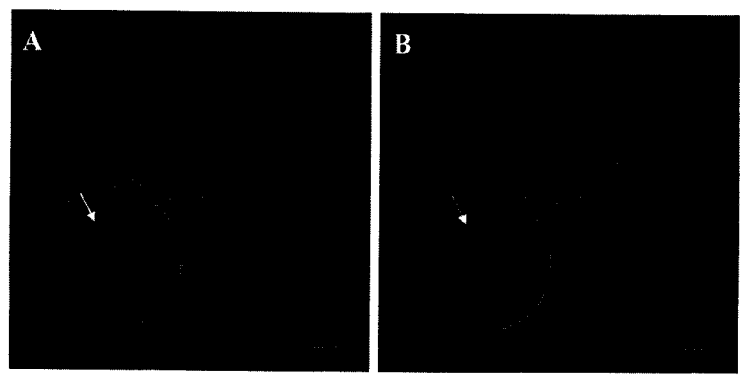
FIG. 18 shows swelling ratios of 2% w/v PMM-CVS$_x$ beads with varying 1000 Da HS-PEG-SH crosslinking concentration.
Figure 19:
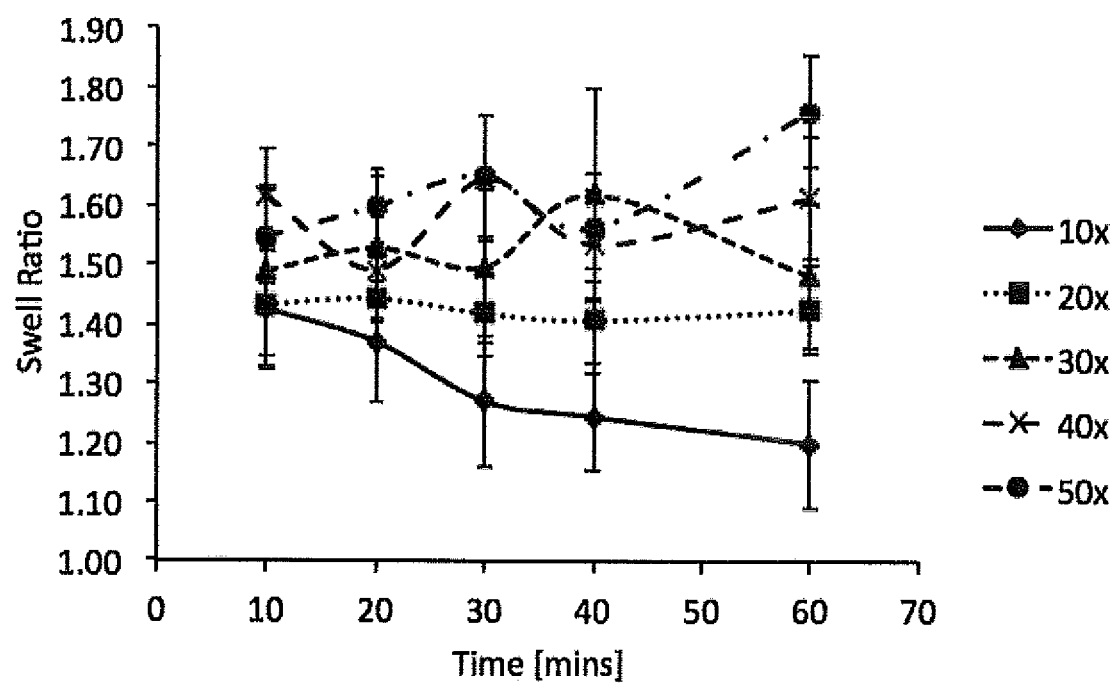
FIG. 19 illustrates bead swell ratios after varying TCEP concentration and exposure time.
Figure 20:
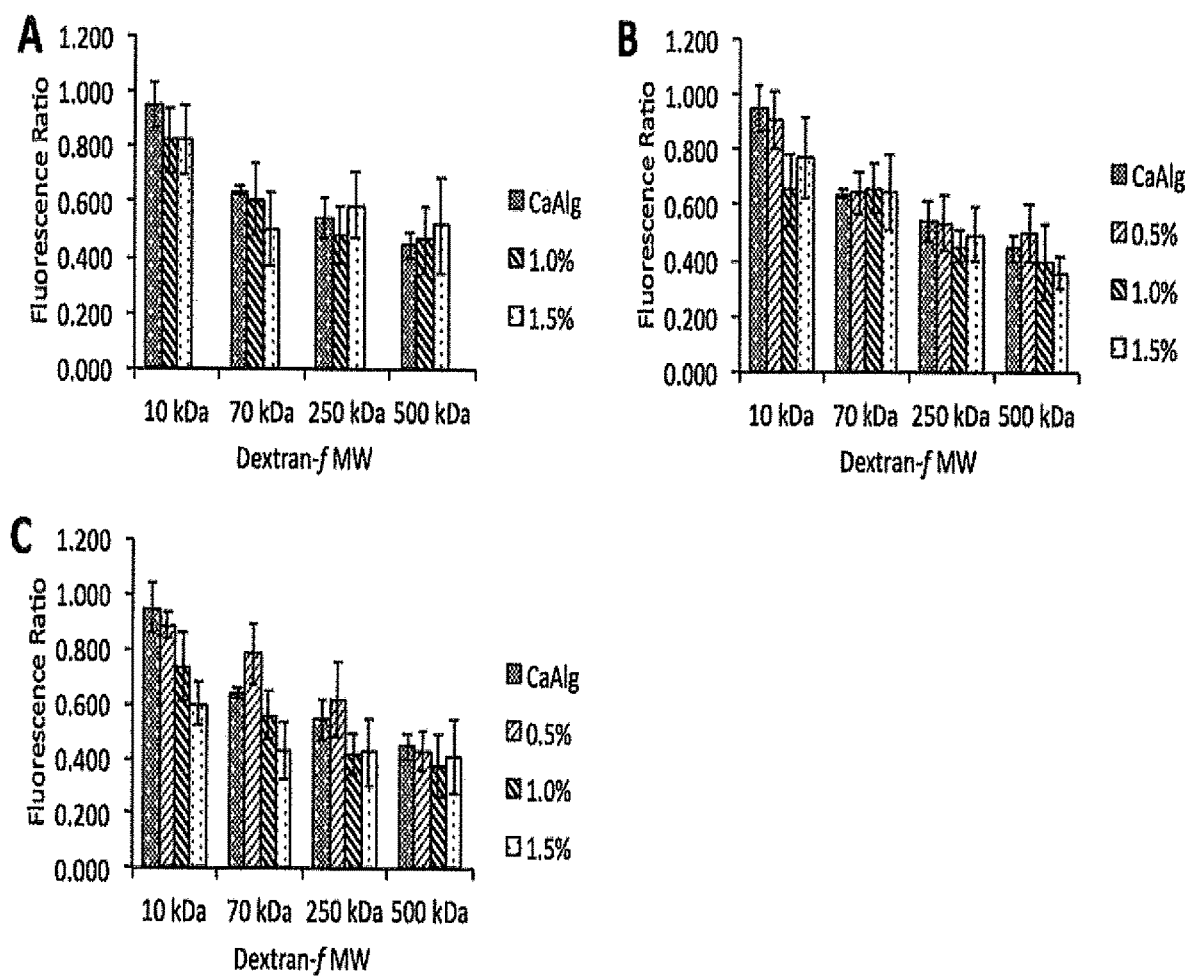
FIG. 20 illustrates in-diffusion of dextran-f into citrate-treated matrix beads composed of A) PMM-CVS10/SPy10, B) PMM-CVS20/SPy20, and C) PMM-CVS30/SPy30.
Figure 21:
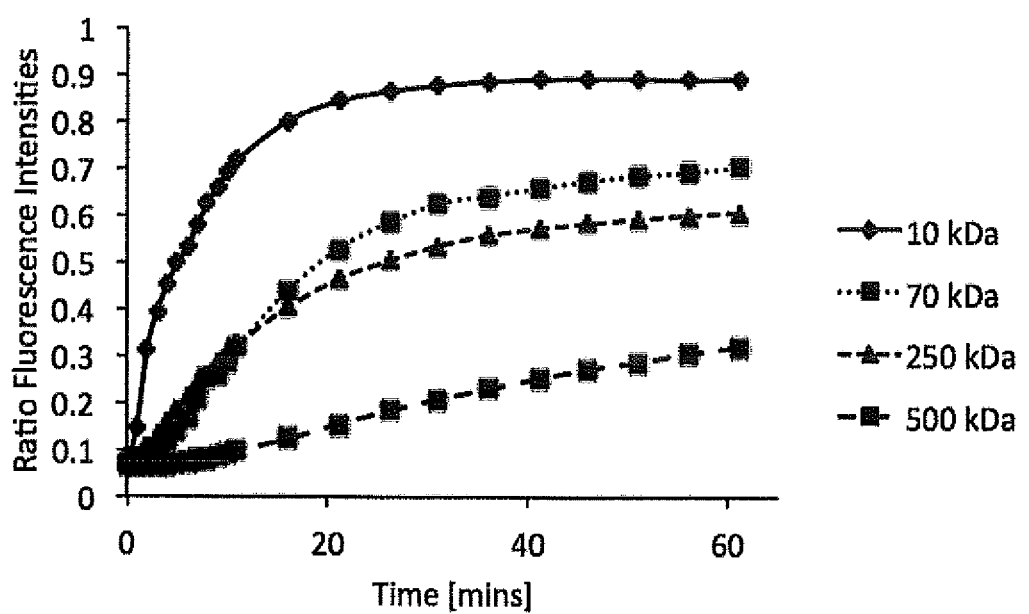
FIG. 21 illustrates the rate of indiffusion of dextran-f (10, 70, 250 and 500 kDa) into citrate-treated 1% w/v PMM-CVS20/SPy20 beads.

Photobleaching of PMM-CVS$_{20}$-r/PMM-SPy$_{20}$/Alginate Composite Beads. A small section of the interior of a 1% w/v PMM-CVS$_{20}$-r/PMM-SPy$_{20}$ calcium alginate bead crosslinked with TCEP was subjected to citrate treatment followed by selective photobleaching of an interior region (arrows), then the bead was imaged over an hour to determine the level of fluorescence recovery in the bleached section of the bead (FIG. 18). Noticeable fluorescence recovery would have indicated presence of soluble polymer in the bead interior. No noticeable fluorescence recovery occurred in the photobleached interior region, indicating that fluorescently-labelled PMM-CVS$_{20}$-r was unable to move within the bead interior and hence that covalent thiol-ene crosslinks were pervasive throughout the entire bead.

Discussion

Cysteamine vinyl sulfone (CVS) trifluoroacetate was synthesized and used to functionalize poly(methyl vinyl ether-alt-maleic anhydride) (PMMAn) by reaction of the CVS amino group with the anhydride. The remaining anhydride groups were hydrolyzed to maleic acid units while preserving the attached pendant functional units, forming PMM-CVS$_x$ with 10, 20 and 30 mol % CVS. Thiol-ene click chemistry was used to form covalently crosslinked bulk hydrogels between PMM-CVS$_x$ and HS-PEG-SH. Properties of these gels such as Young's modulus, gel time and equilibrium swelling could be controlled by varying PMM-CVS functionalization and loading, as well as pH. The hydrogels have elastic moduli matching those of fat, muscle and cartilage, and display low cytotoxicity.

Thiol-ene click reactions between PMM-CVS$_x$ and HS-PEG-SH ($M_n$=1 kDa, 8 kDa) or PMM-SPy$_x$/TCEP were used to form covalently crosslinked hydrogel capsules within ionically crosslinked alginate gel. Most variations in polymer concentration and functionalization percentage resulted in capsules that maintained their structure after alginate removal. The swelling properties of these capsules, indicative of crosslink concentration and pore size, were measured after removal of a temporary ionically-crosslinked alginate scaffold. A decrease in swelling ratio was seen when comparing PMM-CVS$_x$/HS-PEG-SH/alginate systems with increased HS-PEG-SH molecular weight and increased PMM-CVS$_x$ concentration. No significant difference in swelling ratio was seen when comparing beads crosslinked with different concentrations of HS-PEG-SH.

Fast and controllable crosslinking was achieved in the PMM-CVS$_x$/PMM-SPy$_x$/alginate system, with capsules shown to reach maximum crosslink density within 4 minutes in HEPES-buffered gelling bath containing a 10× excess of TCEP. At a 1.5% w/v polymer concentration, tunability of the swelling ratio was seen by varying the percent functionalization of CVS and SPy. Photobleaching experiments indicated the presence of covalent crosslinks throughout the bead, indicated by no fluorescence recovery after 1 h.

Thus, the synthesis and isolation of cysteamine vinyl sulfone (CVS), and reaction with poly(methyl vinyl ether-alt-maleic anhydride) to form a series of CVS-functionalized poly(methy vinyl ether-alt-maleic acid) (PMM-CVS$_x$) polymers containing 10 to 30 mol % vinylsulfone, Aqueous mixtures of PMM-CVSx and a dithiol crosslinker, alpha omega-dithio-poly(ethylene glycol) (HS-PEG-SH), gel via Michael addition within 10 seconds to 45 minutes dependent on pH, degree of functionalization, and polymer loading. The hydrogel may be post-functionalized with the stepwise addition of a small molecule thiol, cysteamine. A Live/Dead fluorescence assay on 3T3 fibroblasts trapped in crosslinked gel samples revealed low cytotoxicity of the hydrogel. In addition, S-(2-aminoethylthio)-2-thiopyridine (SPy) was synthesized, isolated and reacted with PMM to form PMM-SPyx with 10 to 30 mol % pyridine-protected thiol. PMM-CVSx, in sodium alginate solutions extruded into a calcium chloride gelling bath, crosslink by subsequent exposure to HS-PEG-SH. Sodium alginate containing both PMM-CVSx and PMM-Spyx gel in calcium chloride gelling baths also containing SPy-deprotecting agent tris(2-carboxyethyl) phosphine. PMM-CVSx combined with HS-PEG-SH and PMM-Spyx/TCEP at 1-2 wt % polymer loading form composite crosslinked calcium alginate/polymer beads. The thiol-ene Michael addition between the CVS and thiol groups form covalent crosslinks that maintain a capsule after alginate liquefaction.

The invention claimed is:

1. A crosslinked hydrogel comprising a first side-chain functionalized backbone polymer functionalized with an activated alkene, which is a vinylsulfone, acrylate, methacrylate or an alkynyl group, crosslinked with a free or protected thiol-containing compound that is a polar, water-soluble compound comprising two or more thiol groups or a second side-chain functionalized backbone polymer functionalized with an amine-containing crosslinkable compound comprising a thiopyridine, a dithiocarbamate or a thioester.

2. The crosslinked hydrogel of claim 1, wherein the thiol-containing compound is a polyethylene glycol (PEG)-dithiol having a molecular weight in the range of from about 200 to 1,000,000 Daltons.

3. The crosslinked hydrogel of claim 1, wherein the second side-chain functionalized backbone polymer is functionalized with S-(2-aminoethylthio)-2-thiopyridine.

4. The crosslinked hydrogel of claim 1, comprising a hydrogel matrix core or a hydrogel matrix shell.

5. A hydrogel system comprising a crosslinked hydrogel as defined in claim 1 dispersed within a water soluble polymer matrix capable of being gelled using divalent cation binding or thermal gellation.

6. The hydrogel system of claim 5, wherein the polymer matrix is selected from alginate, agarose, cellulose sulphate and combinations thereof.

7. A method of making a hydrogel system as defined in claim 5, comprising:
i) combining an aqueous solution of a first side-chain functionalized backbone polymer functionalized with an activated alkene or epoxy group with a polymer matrix selected from alginate, agarose, cellulose sulphate and combinations thereof; and
ii) adding an aqueous solution of a polyethylene glycol (PEG)-dithiol having a molecular weight in the range of from about 200 to 1,000,000 Daltons under conditions that permit crosslinking, or combining the first side-chain functionalized backbone polymer with a second side-chain functionalized backbone polymer functionalized with a protected thiol group in a polymer matrix selected from alginate, agarose, cellulose sulphate and combinations thereof, and adding a deprotecting agent to the solution which exposes the thiol group of the second side-chain functionalized backbone polymer.

8. The method of claim 7, wherein the deprotecting agent is selected from a phosphine, a dithiothreitol, cysteamine, cysteine, and an amino sugar.

9. The method of claim 8, wherein the deprotecting agent is tris(2-carboxyethyl) phosphine or tris(3-hydroxypropyl) phosphine (THPP).

10. The crosslinked hydrogel as defined in claim 1, formed by reacting an amount of about 0.5 to 15 wt % of a synthetic side-chain functionalized polymer comprising poly(methyl-vinylether-alt-maleic anhydride) (PMMA) functionalized with cysteamine vinyl sulfone or S-(2-aminoethylthio)-2-thiopyridine, wherein cysteamine vinyl sulfone or S-(2-aminoethylthio)-2-thiopyridine comprises between 5 and 40 mol % of the anhydride groups present in the PMMA in aqueous solution with i) an aqueous solution containing di- or poly-thiol poly(ethylene glycol), wherein the poly(ethylene glycol) is present in a concentration that results in a molar ratio ranging from 1:4 to 4:1 of cysteamine vinyl sulfone groups on the synthetic polymer to thiols on the poly(ethylene glycol), or with ii) an aqueous solution of the protected polythiol polymer comprising poly(methylvinylether-alt-maleic anhydride)(PMMA) functionalized with S-(2-aminoethylthio)-2-thiopyridine, wherein crosslinking is initiated by addition of triscarboxyethylphosphine or its sodium salt, or THPP.

11. The crosslinked hydrogel of claim 1, wherein the backbone polymer is selected from homopolymers of polyacrylic acid or polymethacrylic acid; copolymers of acrylic acid or methacrylic acid with anionic, uncharged or cationic monomer;, copolymers of an alkyl vinyl ether with an acid anhydride monomer; copolymers of vinyl ethers of ethylene oxide oligomers with an acid anhydride monomer, polyanhydride and carboxylic acid anhydride polymers; copolymers of aromatic monomers with an acid anhydride monomer; polymers containing epoxy groups, and optionally including neutral or anionic monomers.

12. The crosslinked hydrogel of claim 1, wherein the backbone polymer is a copolymer of an alkyl vinyl ether with an acid anhydride monomer.

13. The crosslinked hydrogel of claim 12, wherein the acid anhydride is maleic, itaconic or citraconic anhydride.

14. The crosslinked hydrogel of claim 1, which is cysteamine vinyl sulfone-functionalized poly(methyl vinyl ether-alt-maleic acid).

15. The crosslinked hydrogel of claim 10, wherein the polymer is a polyanionic, polyfunctional Michael acceptor suitable for crosslinking with Michael donors selected from free and protected dithiols and polythiols.

* * * * *